(12) United States Patent
Ward et al.

(10) Patent No.: US 9,546,054 B1
(45) Date of Patent: Jan. 17, 2017

(54) AUTOMATED MARINE CONTAINER TERMINAL AND SYSTEM

(71) Applicant: Marine Terminals Corporation, San Francisco, CA (US)

(72) Inventors: Thomas A. Ward, Livermore, CA (US); Kai Stuart Martin, Albany, CA (US)

(73) Assignee: Marine Terminals Corporation, San Francisco, CA (US)

( * ) Notice: Subject to any disclaimer, the term of this patent is extended or adjusted under 35 U.S.C. 154(b) by 0 days.

(21) Appl. No.: 14/500,852

(22) Filed: Sep. 29, 2014

Related U.S. Application Data

(63) Continuation of application No. 13/452,831, filed on Apr. 21, 2012, now Pat. No. 8,845,266, which is a
(Continued)

(51) Int. Cl.
*B63B 27/00* (2006.01)
*B65G 63/00* (2006.01)
(Continued)

(52) U.S. Cl.
CPC ............. *B65G 63/004* (2013.01); *B65G 57/20* (2013.01); *B66C 19/002* (2013.01); *B66C 19/007* (2013.01)

(58) Field of Classification Search
USPC .................... 414/137.1, 139.4, 139.9, 140.1, 140.4,414/141.3–141.6, 142.6, 142.7, 495, 498, 531,414/532, 608; 52/219, 28, 79.1, 79.5, 79.9; 220/1.5, 7; 294/81.21, 81.53; 410/46, 56, 410/82
See application file for complete search history.

(56) References Cited

U.S. PATENT DOCUMENTS

| | | | |
|---|---|---|---|
| 4,065,006 A | 12/1977 | Barry | 414/334 |
| 4,611,962 A | 9/1986 | Braly et al. | 410/57 |

(Continued)

FOREIGN PATENT DOCUMENTS

| | | |
|---|---|---|
| JP | 57051621 A | 3/1982 |
| JP | 63101220 A | 5/1988 |

OTHER PUBLICATIONS

Gottwald, "Automated Container Transport/Proven Technology from Gottwald", published by Gottwald, available at http://www.gottwald.com/gottwald/export/gottwaldsite/de/news/pdf/AGV_Prospekt_uk.pdf , as of Jan. 18, 2007.
(Continued)

*Primary Examiner* — Gregory Adams
(74) *Attorney, Agent, or Firm* — DLA Piper LLP (US); Dale S. Lazar

(57) ABSTRACT

A system, equipment; and processes for extending the scope of automation in port container facilities, and thereby increasing port capacity within fixed land resources, increasing operational productivity, increasing safety, increasing the velocity and reliability of goods movement, increasing freight security, reducing negative environmental impacts, and reducing the overall cost of goods movement. A storage area is accessed by automated guided vehicles which receive and unload containerized loads. On the waterside, loads are exchanged between the vehicles and ships using quay cranes. On the ground transportation side, loads are exchanged between the vehicles and truck or rail carriers using semi automated or automated remote-controlled bridge cranes. Within the storage area, loads are exchanged between the vehicles and the storage facilities using automated stacking cranes. The vehicles are adapted to receive a cassette storage platform which in turn receives standard ISO containers. The vehicles also are adapted to receive one or more alternative platforms including a coning platform
(Continued)

for workers to manage container coning, a reefer access and maintenance platform, and a worker transport platform. The use of a single vehicle type with interchangeable platforms allows for maximum flexibility and efficiency. The automation of the vehicle allows for complete contamination within the storage portion of the system.

The system thus substantially extends the reach of automation to cover both landside and waterside intra-terminal transfer operations. By this extension, the interface of workers and machines is greatly reduced, increasing safety, productivity, security, and capacity. By this extension, the robotic control process can be fully optimized, increasing velocity and reliability while reducing the terminal's environmental footprint.

19 Claims, 35 Drawing Sheets

Related U.S. Application Data continuation of application No. 13/165,693, filed on Jun. 21, 2011, now Pat. No. 8,529,187, which is a continuation of application No. 12/220,441, filed on Jul. 24, 2008, now Pat. No. 7,972,102.

(51) Int. Cl.
*B66C 19/00* (2006.01)
*B65G 57/20* (2006.01)

(56) References Cited

U.S. PATENT DOCUMENTS

| | | | | |
|---|---|---|---|---|
| 5,280,980 A | 1/1994 | Coatta | | 294/81.1 |
| 5,299,386 A | 4/1994 | Naegelli et al. | | 49/28 |
| 5,803,701 A | 9/1998 | Filiberti et al. | | 700/215 |
| 5,876,172 A | 3/1999 | Di Rosa | | |
| 5,951,226 A | 9/1999 | Fantuzzi | | |
| 5,953,707 A | 9/1999 | Huang et al. | | |
| 6,129,396 A | 10/2000 | Asada et al. | | 294/86.41 |
| 6,157,915 A | 12/2000 | Bhaskaran et al. | | |
| 6,325,195 B1 | 12/2001 | Doherty | | 192/133 |
| 6,486,899 B1 | 11/2002 | Bush | | |
| 6,709,208 B1 | 3/2004 | Lyrstrand et al. | | 410/115 |
| 6,863,325 B1 | 3/2005 | Mills | | 294/81.21 |
| 6,871,137 B2 | 3/2005 | Scaer et al. | | |
| 7,972,102 B2 | 7/2011 | Ward et al. | | |
| 2004/0257276 A1 | 12/2004 | Huston et al. | | |
| 2005/0021425 A1 | 1/2005 | Casey | | |
| 2005/0091100 A1 | 4/2005 | Riggs et al. | | |
| 2006/0053027 A1 | 3/2006 | Riggs et al. | | |
| 2006/0182527 A1 | 8/2006 | Ranstrom et al. | | |
| 2006/0251498 A1 | 11/2006 | Buzzoni et al. | | |
| 2007/0094943 A1 | 5/2007 | Deisenroth et al. | | |
| 2008/0107504 A1 | 5/2008 | Jung | | |
| 2008/0111693 A1 | 5/2008 | Johnson et al. | | |
| 2008/0127435 A1 | 6/2008 | Maly et al. | | 14/71.1 |

OTHER PUBLICATIONS

Khan, Osama Adnan Ghaffari, "Analysis and Scheduling of Machinery in an Intermodal Terminal by using the OSPF Concept", Department of Interaction and System Design, School of Engineering, Blekinge Institute of Technology, May 2008.

Meersmans, Patrick Johannes Maria, "Optimization of Container Handling Systems", Ter Verkrijging Van De Graad Doctor, Aan De Erasmus Universiteit Rotterdam, Apr. 12, 2002.

Steelen et al., "Container Terminal Operation and Operations Research—A Classification and Literature Review", OR Spectrum (2004) 26:pp. 3-49.

Ward, Thomas, "Equipment, Automation & Operation", JWD Group, a division of DMJM Harris, Jan. 12, 2006.

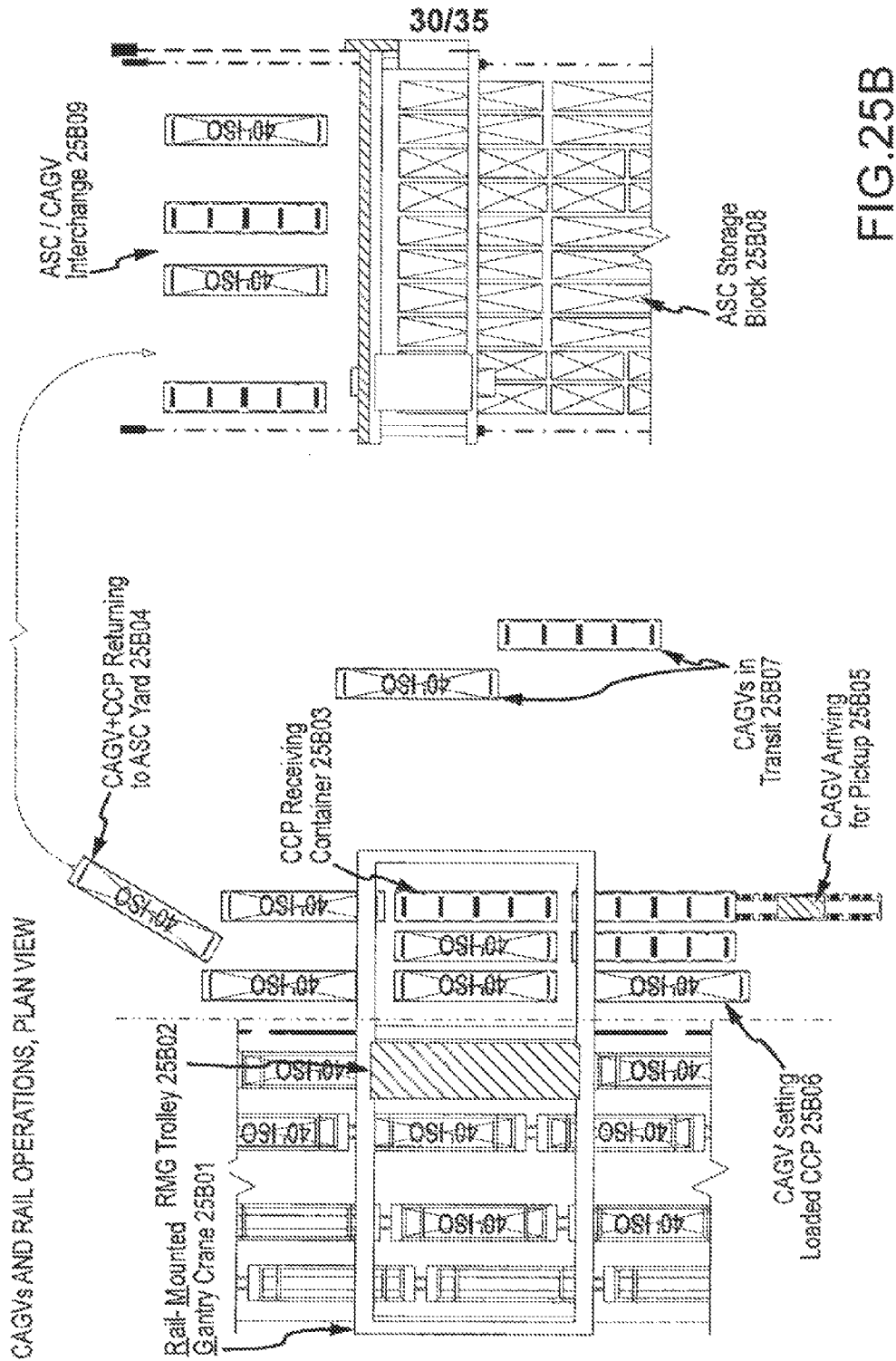

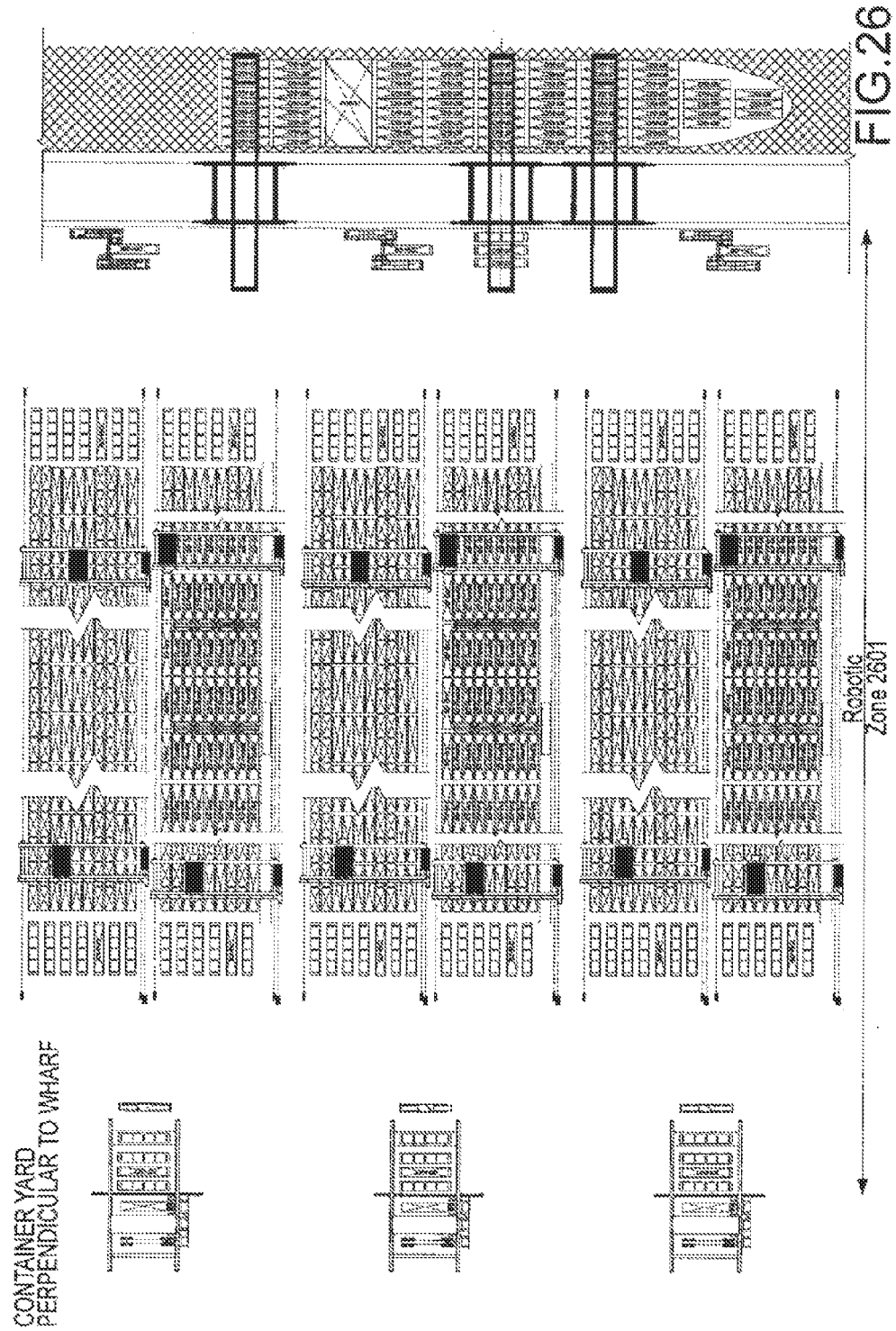

AUTOMATED MARINE CONTAINER TERMINAL AND SYSTEM

CROSS-REFERENCE TO RELATED APPLICATION(S)

This is a continuation of application Ser. No. 13/452,831, filed Apr. 21, 2012, U.S. Pat. No. 8,845,266, which is a continuation of application Ser. No. 13/165,693, filed Jun. 21, 2011, U.S. Pat. No. 8,529,187, which is a continuation of application Ser. No. 12/220,441, filed Jul. 24, 2008, published as US2010/0021272A1, U.S. Pat. No. 7,972,102, all of which are incorporated herein by reference in entirety.

FIELD OF THE INVENTION

The present invention relates to the field of port facilities. In particular, the invention includes a novel system with a robotic operating zone that is essentially entirely automated for the storage and handling of standardized containers used in ocean vessels and ground transportation. Automated stacking cranes convey containers within the robotic operating zone and to transfer zones for loading onto and off of cassette automated guided vehicles which, in turn, interface with buffer zones. From the buffer zones, the containers are loaded and unloaded onto and off of land transportation vehicles, such as rail cars and trucks, and vessels, using bridge cranes and quay cranes. The cassette automated guided vehicles are adapted to receive container-loaded cassettes or, alternatively, other operation elements such as worker platforms of various kinds.

GLOSSARY

The following table is provided to serve as a reference to abbreviations and terminology used in this document.

AGV Automated Guided Vehicle, a driverless computer controlled robotic rubber-tired vehicle equipped with guidance and collision-avoidance systems that carries containers from point to point within a robotic working zone.
ASC Automated Stacking Crane, a robotic or semi-robotic rail-mounted gantry crane that stores, retrieves, and transports containers, and interchanges with ground transport at end buffers.
AVC Automated Van Carrier, also known as an Automated Straddle Carrier or Automated Shuttle Carrier, a robotic rubber-tired vehicle that picks, sets and transports containers within a robotic working zone.
CAGV Cassette Automated Guided Vehicle, a robotic device used to carry CCPs or CWPs from point to point within the Robotic Operating Zone of the terminal.
CCP Container Cassette Platform, a portable structure to hold a container or containers waiting for transport or other handling.
CWP Container Work Platform, a portable structure to transport, hold and support workers who are active within the Robotic Operating Zone of the terminal.
ECS Equipment Control System, a generic term for the information hardware and software used to monitor and control the movements and actions of robotic container handling equipment.
IBC Inter-box connector, or "cone", used to hold containers together above-deck on vessels and in double-stack intermodal rail cars.
MVC Manned Van Carrier, the older manned version of the AVC.
QC Quay Crane, a manned crane used to transfer containers between CCPs in the ROZ and vessels in the Quay Operating Area.
QOA Quay Operating Area, the portion of the terminal extending from the water to the waterside edge of the ROZ.
RBC Remote-control Bridge Crane, a semi-automated crane used to transfer containers between CCPs in the Robotic Operating Zone and trucks in the Truck Circulating Area
RMG Rail-Mounted Gantry crane, a generic term for a class of cranes, including the ASCs; also a specific term within this document for the cranes used to transfer containers between CCPs in the ROZ and train cars in the Rail Operating Area.
ROA Rail Operating Area, the portion of the innovative including rail working tracks, approach tracks, storage tracks, etc., up to the railside edge of the ROZ.
ROZ Robotic Operating Zone, the portion of the innovative terminal where CAGVs and ASCs operate entirely under the control of the ECS, with controlled interfaces at the TCA, QOA, and ROA.
TCA Truck Circulating Area, the portion of the innovative terminal extending from the public street to the landside edge of the ROZ.
TEU Twenty-foot equivalent unit. One 20' ISO container is one TEU, and one 40' ISO container is two TEUs.
TOS Terminal Operating System, a generic term for the information hardware and software used to manage terminal planning, operations, inventory, logistics, and business functions.

BACKGROUND OF THE INVENTION

International Standards Organization ("ISO") Standard shipping containers are used worldwide for moving goods of virtually all types, including raw materials, manufactured goods and components, vehicles, dry and refrigerated foodstuffs, and hazardous materials. All ISO Standard shipping containers have a common width, 8'-0", and a fixed set of modular lengths: 10'-0", 20'-0", 30'40", and 40'-0". The vast majority of shipping containers in use are either 20' or 40' long. A "twenty-foot equivalent unit", or TEU, represents a single 20' ISO container. A 40' ISO container is two TEUs. These ISO containers come in a number of technical variants, including refrigerated containers for perishables, tanks for handling fluids, flat racks and bulkhead racks for handling oversized cargo, car containers, livestock containers, and others.

In addition to the standard ISO container sizes, specialty containers based on the same technology have been put into service in the United States for domestic transport via truck or rail. These containers currently come in 45', 48', and 53' lengths, but have internal framing allowing them to be handled by the same equipment used for 40' ISO containers. Use of a common width and modular lengths has allowed the creation of an extremely efficient and cost-effective system of global freight transportation. The development of an ISO Standard for container dimensions has allowed a globalization of the machinery, systems, techniques, and infrastructure used to handle the containers.

Container transport by sea is largely done in vessels specifically designed to accommodate, protect, and rapidly move standard shipping containers. Most such vessels are "cellular" in design, with most containers stored belowdecks among vertical stanchions that provide container and vessel stability. Vessels come in a wide range of sizes and operational configurations depending on the specific needs of the markets they serve. Vessel deployment changes rapidly over time in response to dynamic market changes.

While shipping containers have been standardized, the vehicles for carrying them have not. Waterborne vessels, trucks, and trains are designed within the context of individual national transport and safety regulations and in response to local and regional market forces. While there is some commonality in dimensions driven by the standardization of container dimensions, overall shapes and dimensions show considerable variability.

Port container facilities provide infrastructure, machinery, and other resources for transferring containers between water-borne and land-borne transport modes. FIG. 1, discussed in detail below, shows the key operational elements of a generic port container facility.

One of the difficulties in designing port facilities is that each site is different. In particular, the geography varies greatly. The specific design of each port container facility must reflect both the standardized elements of container handling and many site-specific geometric and design constraints, along with market-specific logistical and regulatory demands. As such, each port container terminal is unique in its configuration, capacity, productivity, efficiency, safety, and environmental footprint.

To overcome site variability while still providing efficiency in a system that serves a standardized freight module, a variety of common sub-system elements and machines have evolved, ready for selective deployment in each facility as local conditions require.

For example, containerized shipping is inherently flexible because of the modularity of the shipping container. Containerization allows the mixing of a very wide variety of freight types within a single facility or within a single vessel. While the shipping containers are flexible in their deployment, handling, storage, and use, it is still true that each freight unit being moved within a container retains its own logistical needs. All systems involved in container handling must be ready to support the logistical needs of freight beneficial owners and regulatory agencies, while still supporting high productivity and maximum protection for the freight and workers.

Because of the variability of transport vehicles, the variability of port infrastructure, and the variable deployment of container handling equipment, port container operations have traditionally relied largely on manned equipment rather than robotics. The complex interplay of machines has required "human eyes" to ensure the safety of both transport and maritime workers and machines. The demanding physical environment outdoors on the waterfront has made it very difficult to develop effective and reliable instrumentation to substitute for human capabilities in port facilities.

Some activities in the port terminal require close interaction between workers and containers or machines. Container securing devices known as "inter-box connectors" (IBCs) or "cones" are used to hold containers in place on waterborne vessels, and can only be effectively handled by workers. Refrigerated containers ("reefers") must be connected and disconnected against shore power outlets by human workers, and most terminals rely on workers to check the status of reefers while in storage. Container handling equipment frequently needs close attention by mechanics for routine diagnosis, maintenance, and repairs, as well as for swapping specialized cargo-handling hardware.

The complex, variable, and demanding environment of the port container terminal has resisted the development and deployment of automation systems. To date, only a handful of terminals make use of robotic container handling equipment that operates without direct human tactical control. So far, only three types of container handling equipment have been deployed in a robotic configuration: 1) Automated Stacking Cranes (ASCs); 2) Automated Guided Vehicles (AGVs); and 3) Automated Van Carriers (AVCs), each of which is described briefly in the following paragraphs.

AVCs are diesel-electric or diesel-hydraulic machines used to store, retrieve, and transport containers within a fully-robotic container yard designed for AVC-configured storage, as shown in FIG. 2. Each AVC can pick, set, or transport a single container to or from storage stacks that are one container wide and up to three containers high. AVCs interact with manned quay cranes on the waterside edge of the terminal via a "grounded buffer" in the crane's working envelope. See FIG. 3. They interact with manned street trucks on the landside edge of the terminal by having a human operator take control of the AVC and operate it using remote-control to pick or set a container while compensating for variability in truck placement or configuration. See FIG. 4. AVCs have not been developed to interact with on-dock intermodal rail yard equipment; this movement must be done via manned trucks or with manned van carriers.

By far the most common ASCs are electric rail-mounted gantry cranes used to store, retrieve, and rehandle containers within a high-density storage block, typically six to ten container stacks wide and three to five containers high. See FIGS. 5A and 5B. ASCs use their rail gantry drives to transport containers to either end of their storage blocks, which are oriented with their rails perpendicular to the wharf. At the waterside edge of the container yard, ASCs have been used to interact with either AGVs or with Manned Van Carriers (MVCs). At the landside edge of the container yard, ASCs have been used to interact with either street trucks or MVCs.

AGVs are diesel-electric transport units capable of transporting a single container from point to point within a fully-robotic operating zone. See FIGS. 6A through 6E. The AGV cannot pick or set a container as an AVC can, but must rely on direct service by an overhead crane, typically either the ASC in the container yard or the quay crane on the wharf.

In all cases to date, interactions between ASCs and manned machines, whether they are MVCs, street trucks, or yard trucks, require direct intervention by a human operator, working the ASC in remote-control mode. The remote-control operators rely on cameras, lasers, and other instruments to achieve proper container alignment and maintain operational safety. The ASC/manned interface buffer is a complex area, with many safety interlocks intended to protect human workers, with "fail-safe" design that prohibits operation if the safety interlocks are determined to be dysfunctional for either mechanical or environmental reasons. The ASC/manned interface buffer must be well-lit for safety under all operating conditions, contributing to nighttime light pollution. See FIG. 7.

ASCs have been deployed in two general configurations. The "common rail" configuration has one or more ASCs of common rail gauge working over the same storage block, riding on the same pair of gantry rails. The "nested rail" configuration has one or more ASCs of two rail gauges working over the same storage block, riding on separate parallel sets of gantry rails, with a smaller ASC able to pass beneath and within the interior envelope of a larger ASC.

In the "common rail" ASC configuration, the ASCs cannot pass one another. It is generally very difficult or impossible for two such ASCs to share work at the end interface zones: one ASC must be dedicated to serve each end of the storage block. In general, the landside ASC cannot be used to augment productivity on the waterside end of the block, and vice versa. See FIG. 8.

In the "nested rail" ASC configuration, the larger and smaller ASCs can pass one another, albeit with limitations designed to prevent loads being carried by the larger ASC from colliding with the smaller ASC during gantry movement. The two ASCs can be used together to augment productivity at one end of the block or the other, but safety limitations prevent taking maximum advantage of this capability, especially at the landside end of the block where manned transport vehicles are being served. See FIGS. 9 and 10.

The "common rail" ASC configuration is more compact because there are only two rails per block instead of four, no empty space dedicated to allowing suspended loads to safely pass, and only one crane power supply cable runway instead of two. This configuration has high storage density and high terminal capacity, but less productive flexibility than the "nested rail" configuration. The "nested rail" ASC configuration takes up more space, supporting lower storage density and terminal capacity while providing greater productive flexibility. There is no settled industry paradigm identifying either configuration as the "best practice".

The need to separate manned truck or manned van carrier operations from robotic AGV operations has caused virtually all current ASC-based terminals to: 1) run ASC blocks perpendicular to the wharf; 2) use the container yard ASC blocks as a barrier between manned and robotic transport systems. This paradigm works well when there is sufficient land depth perpendicular to the wharf to allow for a proper balance between operational productivity and static storage capacity. For terminals with a limited land depth, this paradigm limits the terminal's storage capacity and can make automation of the facility unfeasible.

Most port container terminals are managed with the support of a "Terminal Operating System" (TOS). The TOS generally encompasses: 1) a sophisticated database system; 2) one or more operational planning tools for organizing terminal activities; 3) commercial communication utilities for coordinating internal and external activities; 4) financial and billing systems supporting interaction between the terminal operator, customers, and regulators; 5) graphical user interfaces that ease data input, output, and manipulation; and 6) labor utilization recording and reporting software in support of financial activities. The TOS is an essential management tool, but most TOS packages were not designed to support or direct robotic automation of container handling. TOS packages are available from a number of vendors including Navis, Cosmos, Tideworks Technology, Total Soft Bank, Realtime Business Solutions, and Embarcadero Systems.

A typical TOS is depicted diagrammatically in FIG. 28. A typical TOS includes internal systems for planning, inventory management, and job control. It includes internal messaging systems that allow transfer of information to and from container yard, vessel, and rail operating elements inside the terminal, as well as external messaging for transfer of information to and from a range of commercial and governmental entities outside the terminal, via Electronic Data Interchange (EDI) or through customer-specific Web Portals.

Each existing and currently-planned automated container terminal has some form of "Equipment Control System" (ECS). Although there is considerable variability in architecture, and in the relationship with the TOS, the ECS generally encompasses: 1) tracking of robotic movement; 2) directed control of robotic movement; 3) processing of remote-control sensor and operating signals; 4) processing of detection sensor information from the manned interface areas; 5) simulation or emulation algorithms for predicting current or future robotic duty cycle performance; 6) sophisticated artificial intelligence for assigning robotic equipment among competing demands based on dynamic prioritization logic; 7) sophisticated artificial intelligence for allocating container storage space while balancing current and future robotic performance for storage and retrieval; and 8) communication and coordination with the TOS and with robotic equipment. ECS packages are available from a number of vendors including Gottwald, TBA, ABB, Hamburg Port Consulting, Informs, and Navis.

A typical ECS is depicted diagrammatically in Figure N. It includes interfaces with the TOS's in-terminal messaging systems, using data from the TOS to dispatch automated equipment to serve jobs in the correct order and with maximum efficiency. The ECS interfaces directly with the hardware and software systems in each automated or manned piece of equipment, pulling information about status, performance, speed, and other factors, and transmitting movement, routing, container handling, and other instructions in the appropriate order.

The TOS and ECS must work together with negligible human intervention for successful operation of an automated terminal. The scopes and capabilities of the TOS and the ECS in the automated realm vary considerably from one facility to the next, and there is no settled paradigm providing a "best of class" configuration for balanced, coordinated activity.

The primary difficulty facing TOS and ECS joint development is the blending of two sets of activities: 1) fully-robotic, predictable, plannable container movements that do not need to protect workers; 2) manned, unpredictable, unplannable container movements that involve substantial robotic safeguards for workers. Theoretically, the TOS has data describing future logistical demand, but these data are frequently imperfect and are never at the level of "tactical granularity" required for the ECS to perfectly understand future demand. The artificial intelligences embodied in the ECS cannot create the "perfect solution" for every array of competing tasks and activities because they cannot predict future manned operating demand or performance. Each ECS must make "best-guess" choices based on rough simulation and emulation calculations, and have some ability to correct or change instructions as the operation evolves. There is no settled paradigm for establishing or applying such corrections.

In summary: 1) Containers are standardized but transport and terminals are not. 2) Terminal operations are variable and resistant to full automation. 3) Some terminal equipment and systems have been the focus of robotization, resulting in a small range of robotic equipment and semi-automated terminals. 4) All existing automated terminals include a complex blend of manned and robotic operations. 5) The blending of manned and robotic operations leads to unpredictability in the demand on the robotic system and complexity in the relationship between workers and robots. 6) Terminal and equipment control systems cannot fully optimize equipment and resource allocation because of the inherent randomness of mixed manned/robotic operation. 7) The need to separate manned and robotic in-terminal transport has limited the applicability of ASC-based systems to terminals with greater land width perpendicular to the wharf.

The current automation paradigms could be improved upon as follows. Eliminate direct interaction between robotic yard cranes and manned transport equipment. Allow required manned activities to take place safely without interfering with the performance of the robotic system. Allow automation of landside container transport, including transport to and from in-terminal rail facilities. Allow full robotization of container storage and retrieval under centralized and optimized TOS/ECS control. Combine the high storage density and capacity associated with "common rail" ASC systems with the high productivity and flexibility of "nested rail" ASC systems. Allow seamless, balanced sharing of waterside and landside operating demands and ASC allocations. Allow semi-automation of in-terminal rail train load and discharge operations. Largely eliminate the impact of random manned container tasks in the centralized optimization of robotic equipment assignment within the ECS. Eliminate the need for fail-safe robotic/manned interfaces between yard cranes and landside transport equipment. Allow terminals with limited land width to take advantage of ASC-based automation.

SUMMARY OF THE INVENTION

This invention resolves all the foregoing unmet needs of the current automation paradigm by automating the transport of all containers to and from the ends of the ASC storage blocks, and by configuring the ASCs and the robotic container transport vehicles so that any robotic transport vehicle has equal access to the transfer zones at both ends of every ASC storage block.

To achieve these results, this invention makes use of a mix of existing technologies in innovative configurations, along with a new class of container terminal operating equipment. The innovative configurations of existing technologies are as follows. 1) Cassette Container Platforms (CCPs) are used to hold containers awaiting handling. 2) Cassette Automated Guided Vehicles (CAGVs) are used to transport CCPs between ASC transfer zones, quay cranes, and Remote-controlled Bridge Cranes (RBCs). 3) Remote-controlled container-handling Bridge Cranes (RBCs) are used for truck service. The new class of operating equipment is the Cassette Work Platform (CWP), which can be adapted to allow safe movement and activities of workers within the robotic transport zone.

The Cassette Container Platform is the descendent of the common shipping palette, redesigned and resized to hold one or more ISO standard containers. See FIGS. 11A through 11K for sample images. This innovative configuration allows the CCP to hold either: 1) a single 40' ISO container; 2) a single 20' ISO container; 3) two 20' ISO containers end-to-end; 4) a 45' container; 5) any specialized shipping container, such as "flatrack", "bulkhead rack", or "tank", that would ordinarily be handled in a container terminal. An alternative embodiment of the invention encompasses use of CCPs adapted to the handling of non-ISO shipping containers that may be handled in container terminals. The CCP is configured so that containers may be placed on the CCP with inter-box connectors (IBCs, or "cones") inserted into their lower corner-castings, and so that these IBCs can be removed or inserted safely by terminal workers. The CCP is not powered and has no internal processing, signaling, or detection capabilities; it is an "inert" container "sled".

The Cassette Automated Guided Vehicle is reminiscent of the common robotic "palette jack" used in warehouse and industrial settings, redesigned and resized to hold and transport CCPs or CWPs. See FIGS. 12A through 12E. The CAGV is configured to move in two modes: Lowered and Raised. In Lowered mode, the CAGV can slide beneath a CCP or CWP. Once aligned to a CCP or CWP, the CAGV can be elevated slightly to its Raised mode, lifting the CCP or CWP clear of the ground. In Raised mode, the CAGV can transport CCPs or CWPs from point to point in the terminal. The CAGV is self-powered using stored energy or fuel. The CAGV has navigational sensors that continuously scan a pre-established network of navigation beacons. Internal processing systems compare the navigational scanning data with a pre-established internal map of beacon identities and locations to establish the CAGV's precise location anywhere within the terminal. The CAGV has safety sensors that continuously scan in the direction of the CAGV's travel to detect obstacles. Internal processing systems interpret data from the safety scanners to adjust the CAGV's movement vector so as to avoid collisions with mapped or unmapped obstacles, and so as to provide for rapid and safe alignment beneath CCPs and CWPs. The CAGV is equipped with data and power links for safe, automatic connectivity with any CWP that it may be carrying. Several companies now manufacture vehicles suitable for a CAGV, including TTS Marine ASA in Sweden.

The Remote-controlled Bridge Crane (RBC) is a variant on the common industrial bridge crane, configured to handle ISO containers using an ordinary container spreader, as shown in FIG. 30A. The RBC concept is shown in FIGS. 13A through 13C. This innovative configuration of the RBC provides transfer of containers between the truck zone, where human workers can be found, and the Robotic Operating Zone (ROZ) of the terminal. The RBC provides a hybrid of fully-automated operations on the robotic side of its work zone, and remote-controlled operation over the truck zone.

The Cassette Work Platform (CWP) is an entirely new and innovative class of container terminal operating equipment, designed specifically to work in concert with CAGVs and CCPs. The CWP provides a safe environment for the transport of workers and their tools within the terminal's robotic operating zone, and allows workers to safely and effectively carry out operations that rely on human skill within the robotic zone. The CWP has a number of variant configurations to support a broad range of worker activities. See FIGS. 18A through 18C for the generic configuration of the CWP that is the base for all the variants. The CWP rests on a base with the same internal and external dimensions as the CCP. The base is equipped with laser-reflection panels on all sides so that they can be easily detected by CAGVs in motion. Additionally the location of the CCP is known in the system by virtue of it being moved by CAGVs which are tracked in system, allowing proper system-controlled clearance around CWPs and other obstacles. The CWP is designed to be transported by a CAGV or any other container cassette transport machine. The CWP has a roof providing overhead worker protection, and protective screen gratings on all sides to prevent accidental interaction between workers and other terminal operations. Radio-frequency safety locator devices on the roof allow the terminal's ECS to "see" all CWPs at all times. A broadband wireless communication antenna on the roof, supported by on-board processors, allows communication between the CWP's workers and the TOS, ECS, or other systems. Access to the CWP is through sliding doors controlled by security access panels. The CWP's on-board processors will keep track of workers entering or leaving the CWP through monitoring of safety sensors and other fail-safe devices built into the CWP. This can include the use of worker identity badge swiping, safety light curtains, lasers, infra-red sensors, and the processing of signals from pressure-sensitive mats.

The following specific innovative variants of the CWP are part of the system invention: 1) Coning; 2) Reefer Access & Maintenance; 3) Crane Maintenance: 4) Worker Transport and Services. The Coning CWP allows workers to cone and de-cone containers carried on CCPs/CAGVs near the waterside edge of the Robotic Operating Zone (ROZ). The Reefer Access & Maintenance CWP transports reefer mechanics and their working gear to and from the reefer storage racks embedded within the ROZ. The Crane Maintenance CWP transports crane mechanics, their working gear and tools, and heavy objects, to and from Automatic Stacking Cranes in the ROZ. The Worker Transport and Services CWP transports gangs of workers across the ROZ, between secure check-in/check-out stations scattered along all edges of the Zone.

Using the elements described above, an innovative automated terminal configuration is demonstrated. The terminal has three broad zones where workers may be active: 1) Truck Circulation Area (TCA); 2) Quayside Operating Area (QOA); and 3) Rail Operating Area (ROA). These zones adjoin or surround the Robotic Operating Zone (ROZ). Within the ROZ, all machine movements and actions are robotic, under centralized direct control and monitoring by the ECS. Interface between the three active-worker zones and the ROZ is carried out by cranes lifting containers over safety barriers to or from CCPs resting in buffer zones. Under current safety regulations, these cranes are either locally or remotely controlled by workers for all fine positioning against variable or manned targets. With continuing evolution of technology and regulation, an alternative embodiment of this invention encompasses full automation of the interface cranes.

An essential innovation in the configuration of the container yard is the continguity of the entire ROZ. CAGVs can go anywhere within the CAGV, and special lanes within the ASC storage blocks allow CAGVs to transport CCPs and CWPs between the quay and all other areas of the terminal.

The isolation of the ROZ from the active-worker zones eliminates direct interaction between robotic yard ASCs and manned transport equipment.

The introduction of the innovative suite of CWPs allows required manned activities inside the ROZ to take place safely without interfering with the performance of the robotic system.

The introduction of the RBCs for the TCA/ROZ interface allows automation of container transport on the landside edge of the ROZ, including transport to and from the ROA.

As the container yard ASCs interact only with CCPs and CWPs transported solely by CAGVs under central ECS control, all container storage and retrieval operations are robotized, and all robotic movements are subject to centralized optimization by the ECS and TOS.

By providing for contiguity of the ROZ, the system allows all CAGVs to be served at either end of any ASC block. This allows, for example, for the use of the landside ASC buffer area to serve waterside operations at the QOA, with CAGVs transiting the length of the ASC run with loaded CCPs. This means that, with a "common-rail" ASC configuration, either ASC within a block can be used, without penalty, for operations on either side of the container yard. This allows the system to achieve the high productivity and flexibility of a "nested rail" ASC system, while maintaining the high storage density and capacity of a "common-rail" configuration.

As any ASC can serve any CAGV, regardless of the CAGV's ultimate origin/destination or the nature of its work assignment, the operating demands on the two ASCs within any block can be centrally optimized and seamlessly balanced.

Innovative introduction of CAGVs and CCPs into the on-dock intermodal rail operation allows introduction of remote control and semi-automation on the interface cranes at the ROA.

By separating the ASCs from the interface cranes at the edges of the ROZ, the performance of the ASCs can be isolated from the impact of random operations in the active-worker zones. The operation of street trucks is notoriously random. Introduction of the RBCs, at stations that are not rigidly tied to any one ASC block, allows redistribution of random truck transactions across the landside edge of the ROZ, with the CAGVs providing long-distance transport between ASCs and RBC stations and decoupling the ASCs from truck randomness.

Because ASCs interface only with CCPs in their block-end buffer zones, there is no need for elaborate, complex, fail-safe interfaces between the ASCs and manned transport equipment, such as trucks or Manned Van Carriers, at the buffer zones.

Because the ROZ is contiguous and CAGVs can go anywhere, there is no longer any driving reason to orient ASCs runs perpendicular to the wharf, as has been the case in all prior automated terminals. With ASC runs set parallel to the wharf, terminals with limited land width can take advantage of automation using this innovative system.

By allowing more flexible deployment of ASCs across different terminal shapes, the scope of automation is increased with this system. As ASC-based systems support higher storage density than traditional systems, port capacity can be enhanced within fixed port land resources. Extending the reach of robotization within the terminal increases productivity and safety, and subjects all movements to central control which will make performance more uniform and predictable. By restricting manned interactions to small areas where the ROZ and the active-worker zones meet, overall terminal lighting is substantially reduced, thus reducing the terminal's environmental footprint. Reducing reliance on high-cost labor reduces the overall cost of goods movement and enhances economic competitiveness.

BRIEF DESCRIPTION OF THE FIGURES

The following paragraphs describe the Figures. The Figures are meant to be exemplary rather than specific. Each container terminal is different, and so the dimensions of storage blocks and traffic circulation areas would need to be adjusted to satisfy local conditions in a manner that will be apparent to a person skilled in the field.

FIGS. 25A and 25B, CAGVs and Rail Operations, show side and plan views of the operating relationships within an exemplary intermodal rail yard that relies on rail-mounted gantry (RMG) cranes for transfer of containers between CCPs and rail cars.

FIG. 26, Container Yard Perpendicular to Wharf, shows an exemplary layout of a container terminal with ASCs in their traditional configuration, running perpendicular to the quay.

DETAILED DESCRIPTION

Figure 1:
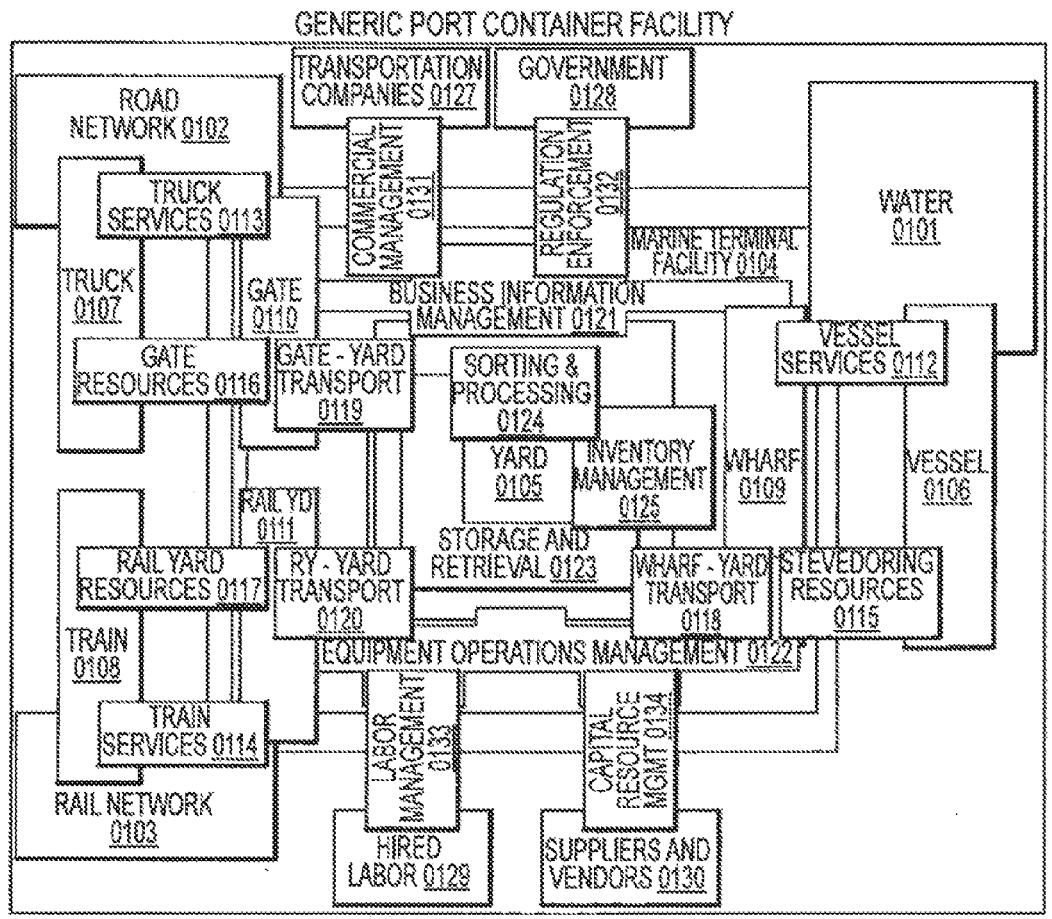
FIG. 1, Generic Port Container Facility, shows the major logical elements of a modern port container terminal. Each shape represents a major operating component, resource, or activity, and the overlapping of shapes roughly represents the interactions between these elements.

FIG. 1, Generic Port Container Facility, shows the major logical elements of a modern port container terminal. Three major external transport media, (Water 0101, Road 0102, Rail 0103) meet at the marine terminal facility (0104). Containers are transferred between carriers (Vessels 0106, Trucks 0107, and Trains 0108) via the Yard 105. Carriers are served at terminal portals (Wharf 0109, Gate 0110, Rail Yard 0111). The terminal may provide special support services to carrier operators at the portals (Vessels 0112, Truckers 0113, Trains 0114). Containers are received or delivered at portals by portal equipment (Stevedoring cranes 0115, Gate lanes 0116, Rail Yard cranes 0117). Containers are transported between the portals and the Yard 105 by intra-terminal transport equipment (Wharf 0118, Gate 0119, Rail 0120). Transactions across the portals are tracked and managed through Business Information Management 0121. Container handling equipment operations are tracked and managed through Equipment Operations Management 0122. Containers are stored and retrieved within the Yard 0105 by cranes or other equipment 0123. Containers may be sorted and processed within the Yard 0105, or between different areas, using Sorting Equipment 0124. Container inventory is tracked and managed using Inventory Management systems 0125. The entire terminal is embedded in a comprehensive Security 0126 system. The managers of the terminal must interact with external entities (Transport Companies 0127, Government 0128, Labor 0129, and Suppliers/Vendors 0130). These interactions take place through a range of business systems (0131 thru 0133). This is a very generic description of a marine container terminal, but it provides a useful framework for understanding the context of the invention.

FIGS. 2 through 10 depict the existing state of the art in container terminal automation. They are provided as background information to allow comparison and contrast with the invention. There is no settled paradigm for container terminal automation, and there are a number of variants already running or being planned. While it is not possible to describe all variants here, these figures provide a reasonable cross-section of the industry.

Figure 2:
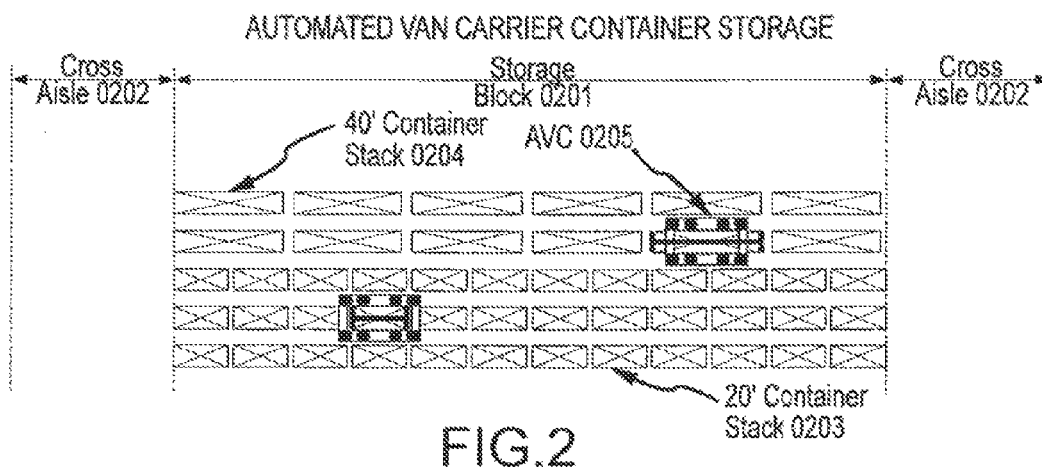
FIG. 2, Automated Van Carrier (AVC) Container Storage, shows a plan view of the layout of container storage in a typical AVC-based container yard. The configuration for Manned Van Carriers (MVCs) is essentially identical.
Figure 3:
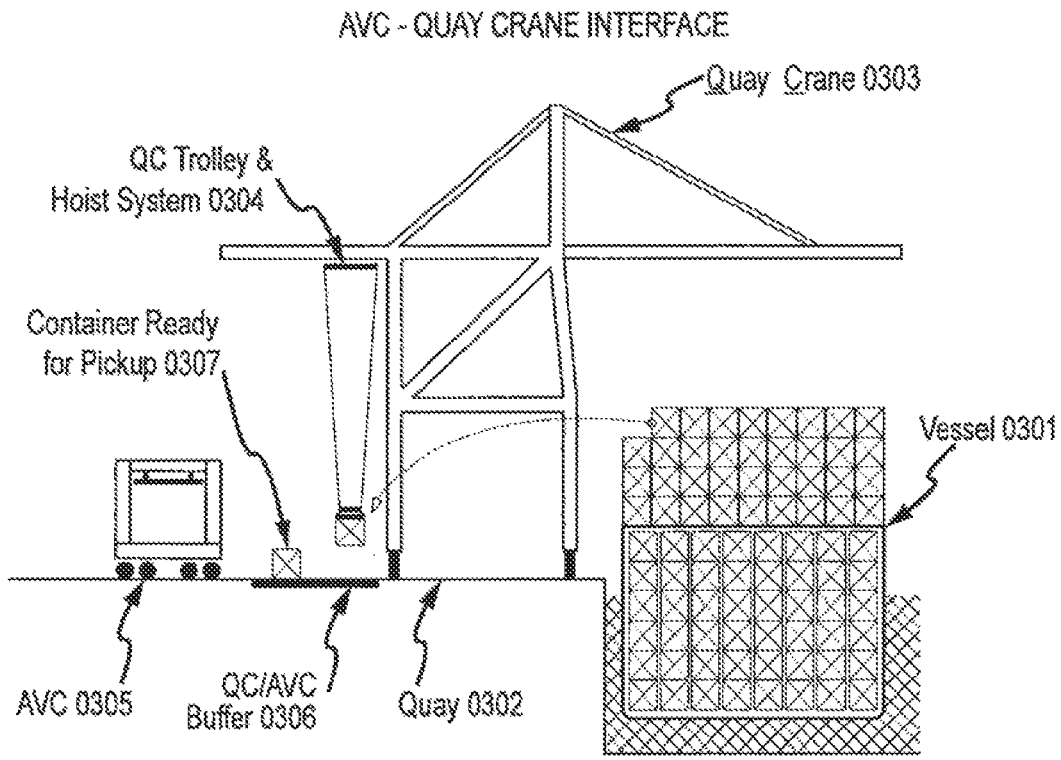
FIG. 3, AVC—Quay Crane Interface, shows a cross-section of the area used for transferring containers between AVCs and quay cranes serving vessels at the waterside edge of the terminal.
Figure 4:
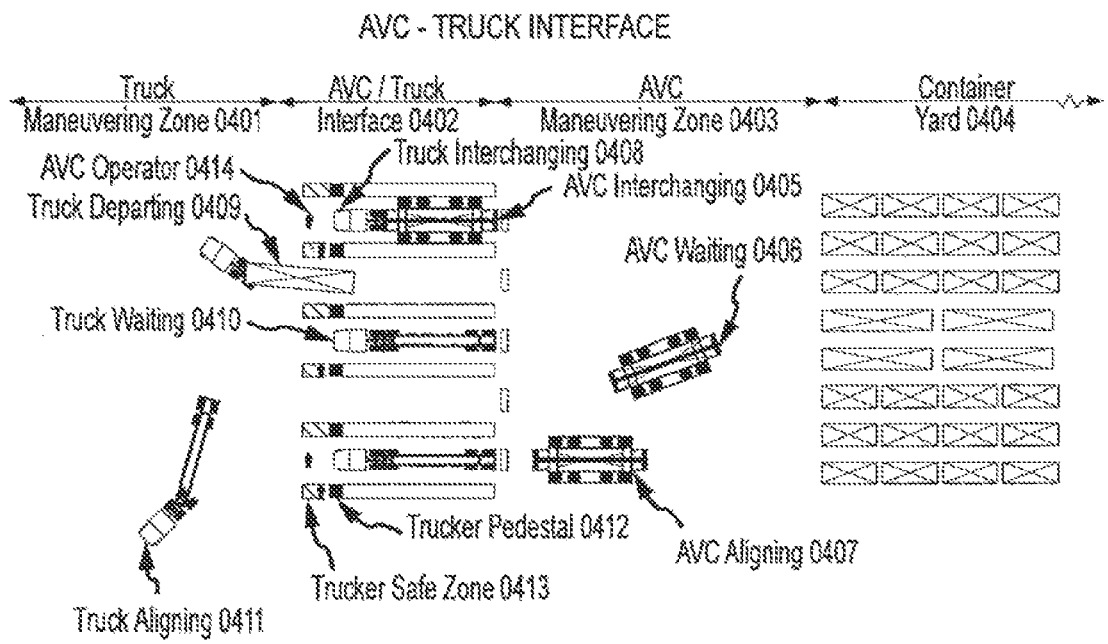
FIG. 4, AVC—Truck Interface, shows a plan of a typical area used for transferring containers between AVCs and manned trucks at the landside edge of the terminal.

FIG. 2 shows the layout of a storage block 0201 within the Yard 0105 of a terminal based on Automated Van Carriers (AVCs 205). FIG. 3 shows the interaction between AVCs and quay cranes at the wharf. FIG. 4 shows the interaction between AVCs and trucks at the gate.

The AVC storage block 0201 holds single rows of ISO containers (0203, 0204) stacked up to two or three high. The AVC 0205 approaches one of these rows along a cross aisle 0202, maneuvers to align to the row, and transits along the row to the target storage location. Once at its target location, the AVC picks or sets a container using its spreader, FIG. 30A, and drives to the cross aisle at the far end of the row. The AVC is fully robotic, with navigation relying on Differential Global Positioning Systems (DGPS) combined with short-range obstacle recognition and avoidance systems. The AVC combines long-distance container transport (0118, 0119, 0120) to and from the terminal's portals (0109, 0120, 0111). At the wharf 0109 or rail yard 0111, the AVC picks or sets containers on the pavement in a buffer area 0306 (see FIG. 3), which is accessed by a quay crane 0303 or rail yard crane 0117. At the gate, the AVC 0405/0407 (see FIG. 4) is operated under remote control by a worker 0414, picking or setting containers at street trucks 0410 in interface slots 0402, while truck drivers stand in safe zones 0413 adjacent to data interchange pedestals 0412. AVCs are restricted while working in adjacent storage rows, as the "leg space" between adjacent rows is shared, preventing AVCs from passing one another in either direction. This system has much lower storage density and overall terminal capacity than other automated systems.

Figure sets 5 and 6 show the most common container handlers used in automated terminals: the Automated Stacking Crane (ASC) and the Automated Guided Vehicle (AGV). The ASC is used for storage and retrieval in the Yard 0105. The AGV is used for intra-terminal transport 0118 between the Yard and the Wharf 0109.

Figure 5A:
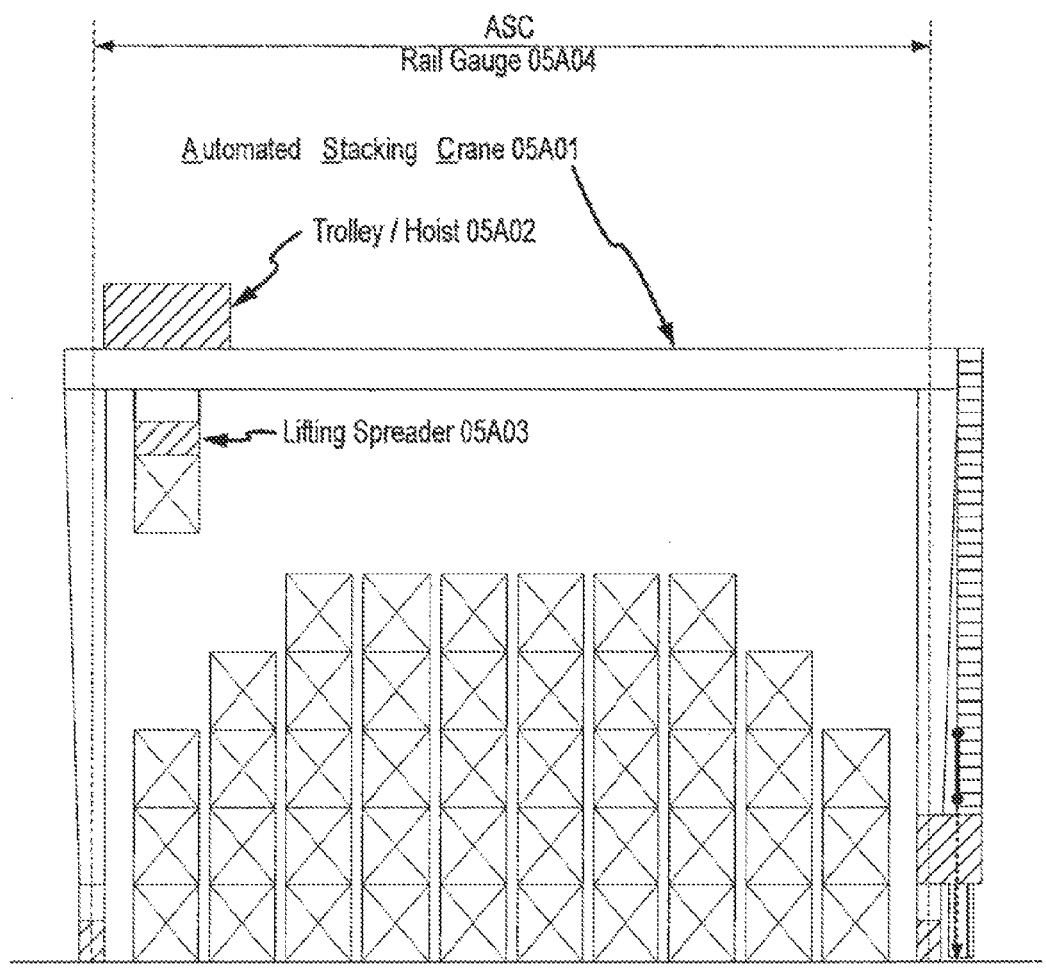
FIGS. 5A and 5B, Automated Stacking Crane Cross Section, show typical end-view and side-view cross-sections for a rail-mounted Automated Stacking Crane, including the major components of the crane.
Figure 5B:
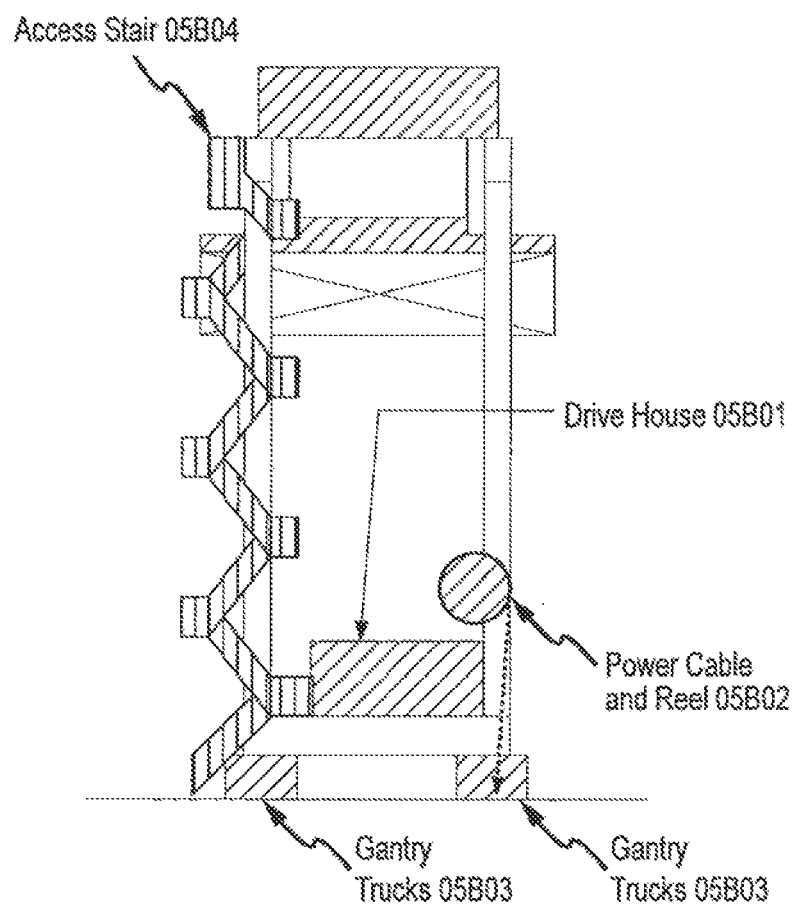
Figure 6A:
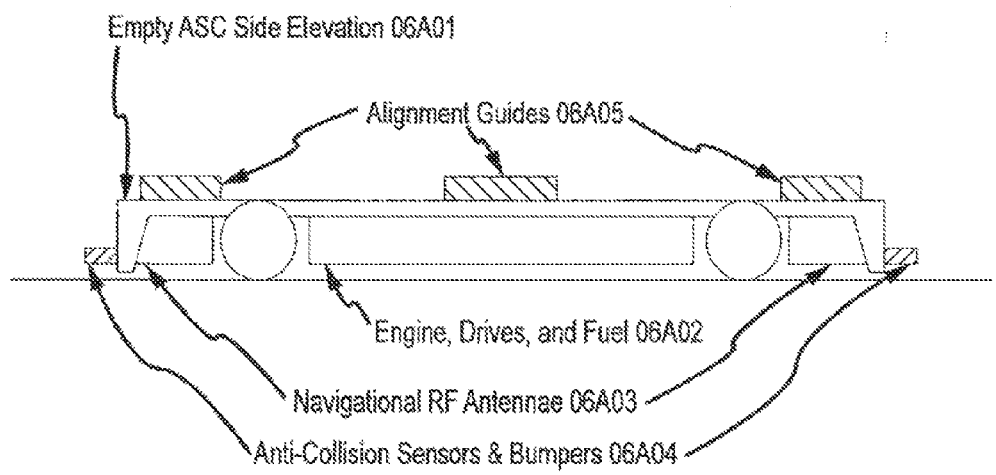
FIGS. 6A through 6E Automated Guided Vehicle, show side, end, and plan views of typical empty or loaded Automated Guided Vehicles used for robotic in-terminal transport of containers.
Figure 6B:
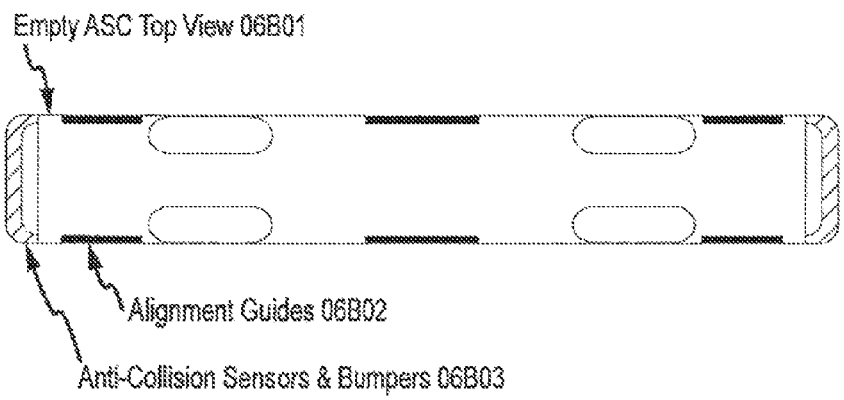
Figure 6C:
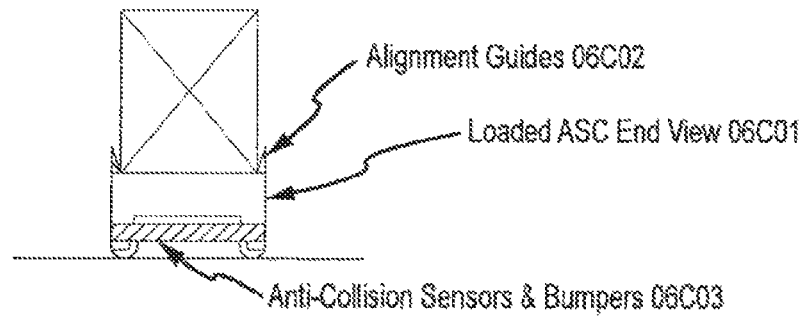
Figure 6D:
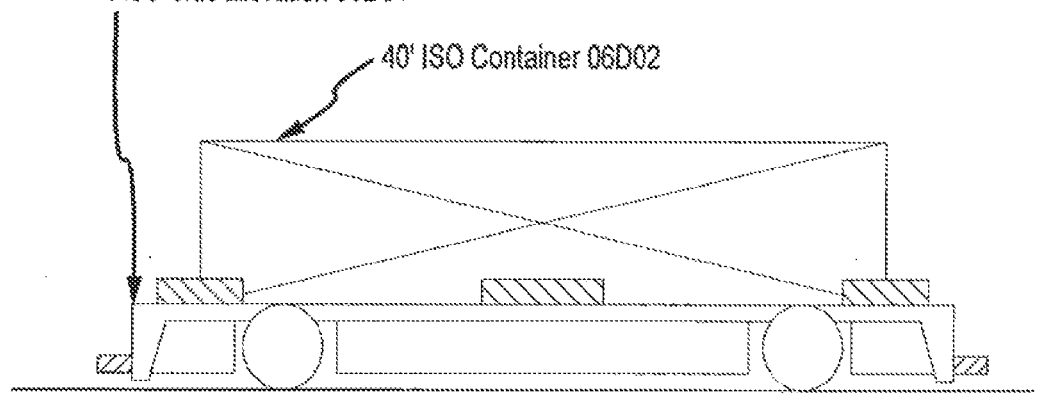
Figure 6E:
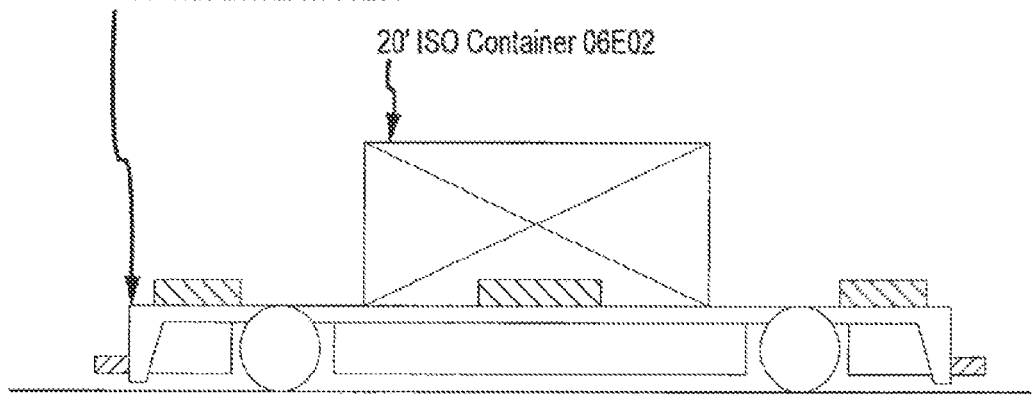

As shown in FIG. 5A, the ASC 05A01 is an electrically-powered rail-mounted gantry crane. Containers are picked or set using the spreader 05A03, hoisted vertically and shifted laterally using the trolley/hoist machinery set 05A02. The cranes drives are controlled and monitored from power and logic systems in the drive house 05B01. Power is delivered to the crane via a cable connecting a ground vault and a crane-mounted cable reel 05B02. The power cable also typically includes a fiber optic cable for the crane's data connection. ASCs typically use regenerative braking, allowing conservation of electrical energy. The crane transports containers parallel to the container block using its gantry trucks 05B03 running on rails on fixed foundations. Maintenance worker access is via stairs 05B04 leading to the drive house 05B01 and the trolley/hoist machinery set 05A02.

The AGV 06A01 shown is a diesel-electric or diesel-hydraulic powered container transport machine (see FIGS. 6A through 6E). Containers are picked or set against the top of the machine, guided by lateral alignment guides 06A05/06B02/06C02. The main engine, auxiliary drives, and fuel supply are stored beneath the container bed, 06A02. Radio-frequency navigational antennae 06A03 interact with fixed navigational beacons at specified intervals. On-board systems interact with the ECS to direct the AGV along a programmed path among the in-ground beacons. Anti-collision sensors and bumpers 06A04/06B03/06C03 provide safety against collisions with unmapped obstacles, including workers who may be in the AGV work zone. Unlike the AVC 0205, the AGV cannot pick or set a container by itself; it is served by an ASC 05A01 or by a quay crane. As such, it does not provide "buffered" interaction at the end points of its duty cycle; it must await crane service. In all terminals to date, the AGV is used solely for transport between the waterside end of the ASC block and the backreach of the quay crane. As such, only the waterside edge of the yard is fully robotized.

Figure 7:
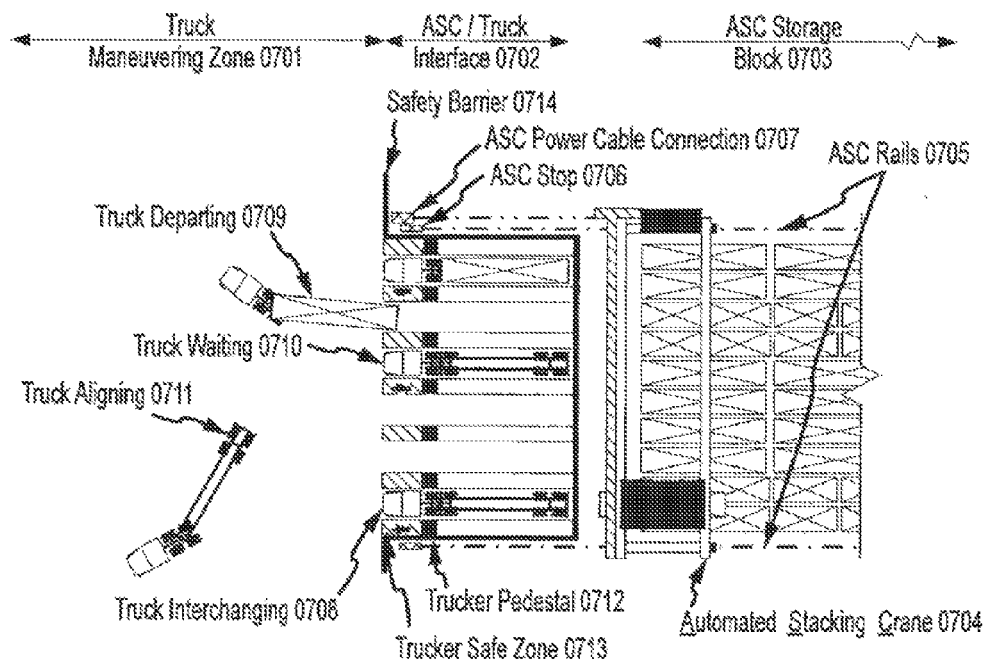
FIG. 7, Typical ASC/Manned Interface Buffer, shows a typical plan for an area where remote-controlled ASCs interface with manned trucks or other equipment at the landside edge of the terminal.

FIG. 7 shows the landside end of a typical ASC storage block, where ASCs interact with street trucks. As an example, consider the "deliver import to truck" transaction. The ASC 0704 retrieves the container from the storage block 0703 and, still under robotic control, moves along the gantry rails 0705 to the edge of the ASC/truck interface zone 0702. Meanwhile, the street truck, having passed the gate, comes to the interface zone through the truck zone 0701, aligns 0711, and parks in an interchange slot. The trucker leaves the truck cab and checks in at the trucker data pedestal 0712, then stands in the safe zone 0713. Once the ASC has reached the edge of the interface zone, it is placed under the control of a human operator, who directs the movement of the ASC into the interface zone, and the setting of the container on the interchanging truck 0708. The remote operator returns the ASC to the edge of the interface zone and reverts it to robotic control, and then the truck re-boards the truck and departs 0709. The "receive export from truck" transaction is symmetric. The trucker is barred from entering the ASC work zone by a safety barrier 0714, and the ASC has a substantial suite of instruments to support safe interaction with the truck by the remote operator. Because the timing of truck motion is not under robotic control, it is difficult to fully optimize ASC operation with this configuration.

Figure 8:
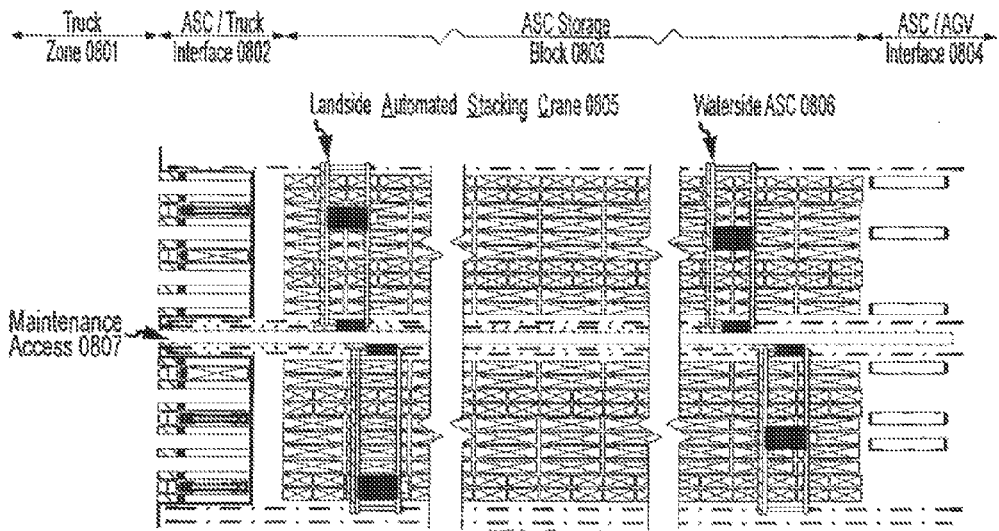
FIG. 8, Common-Rail ASC Storage Block Plan, shows a typical plan for a container storage block served by two ASCs on a common gantry rails.
Figure 9:
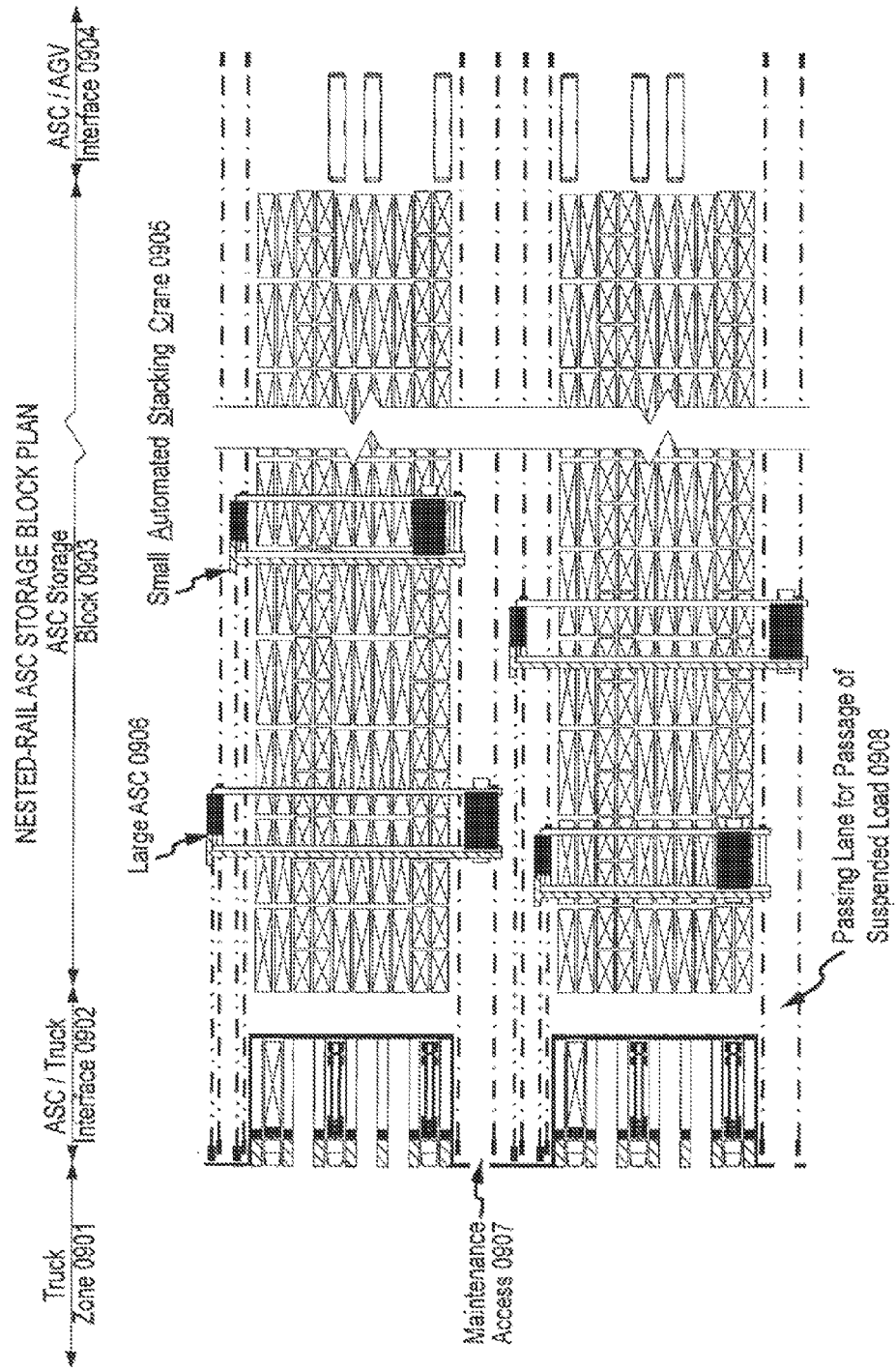
FIG. 9, Nested-Rail ASC Storage Block Plan, shows a typical plan for a container storage block served by two ASCs of different rail gantry gauge.
Figure 10:
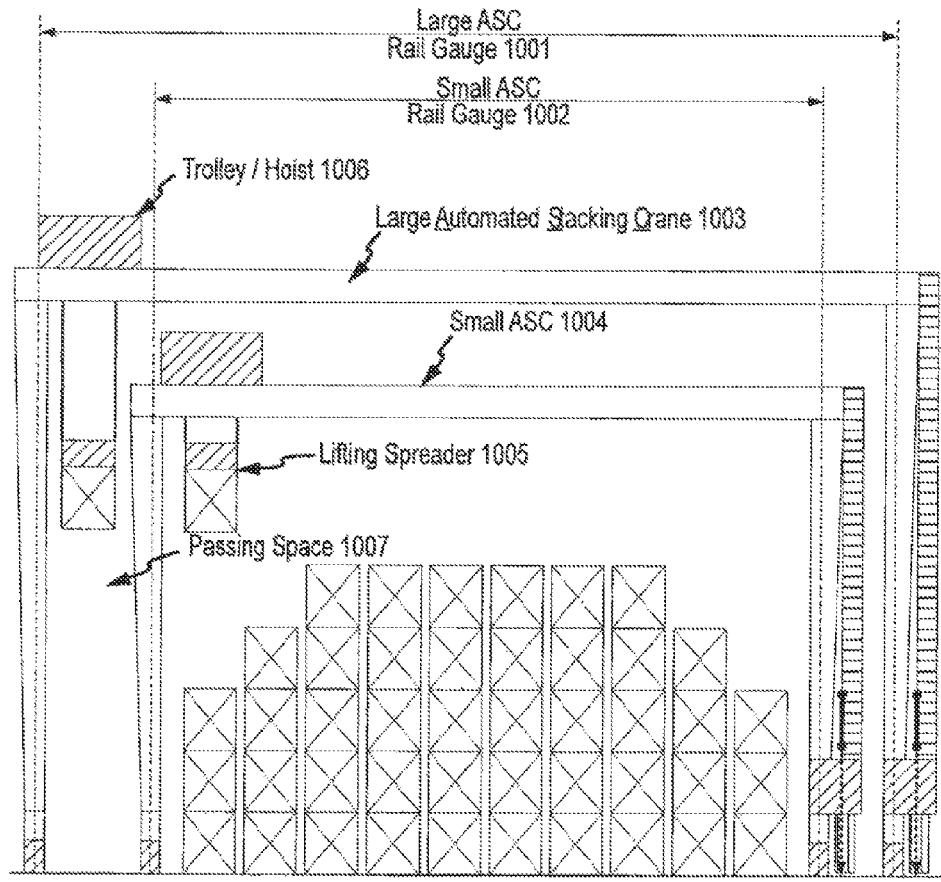
FIG. 10, Nested-Rail ASC Storage Block Cross-Section, shows a typical cross-section for a container storage block served by two ASCs of different rail gantry gauge.
Figure 11A:
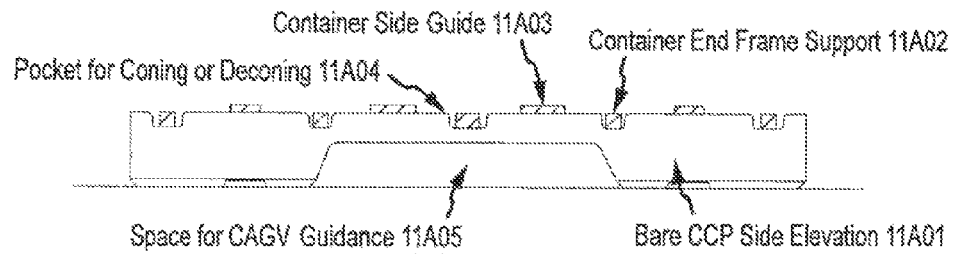
FIGS. 11A through 11L, Cassette Container Platform, show side, end, and plan views of an exemplary configuration for a CCP capable of handling a single 20', 40' or 45' ISO container or two 20' ISO containers. The figures show the CCP empty, loaded with a range of ISO containers, or stacked for storage.
Figure 11B:
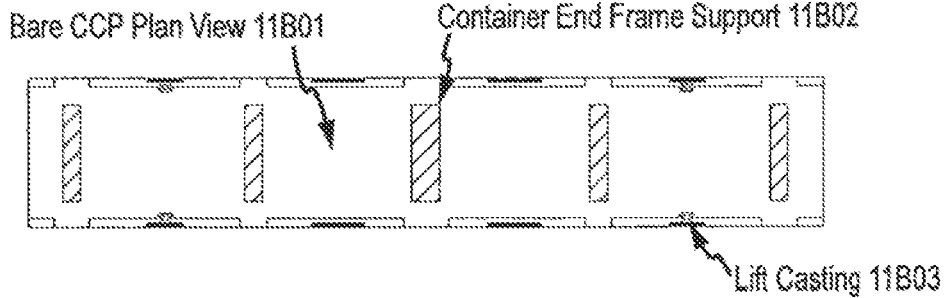
Figure 11C:
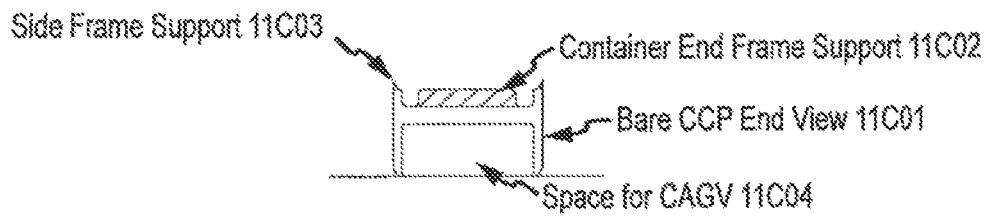
Figure 11D:
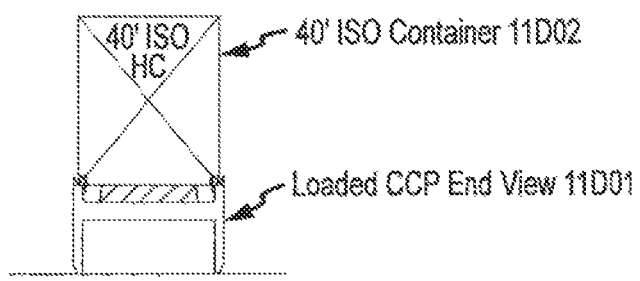
Figure 11E:
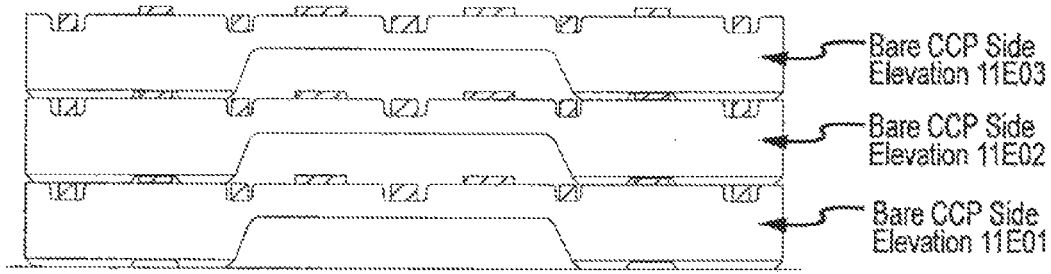
Figure 11F:
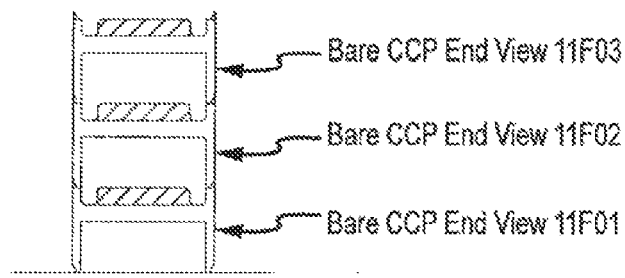
Figure 11G:
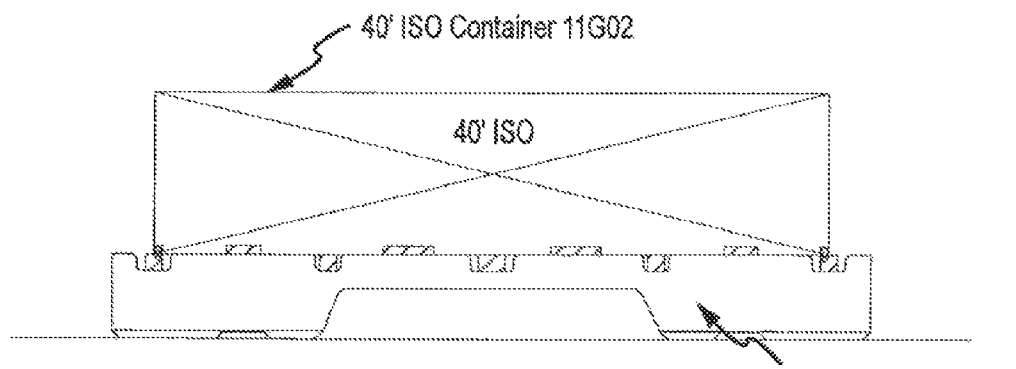
Figure 11H:
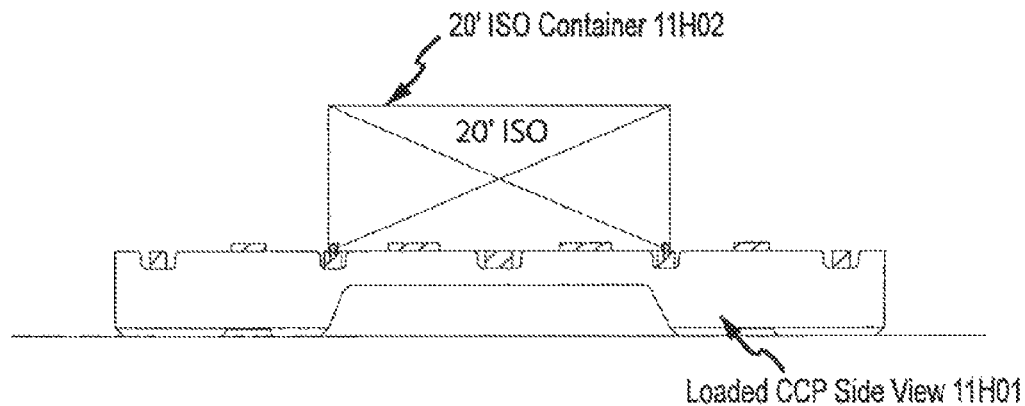
Figure 11I:
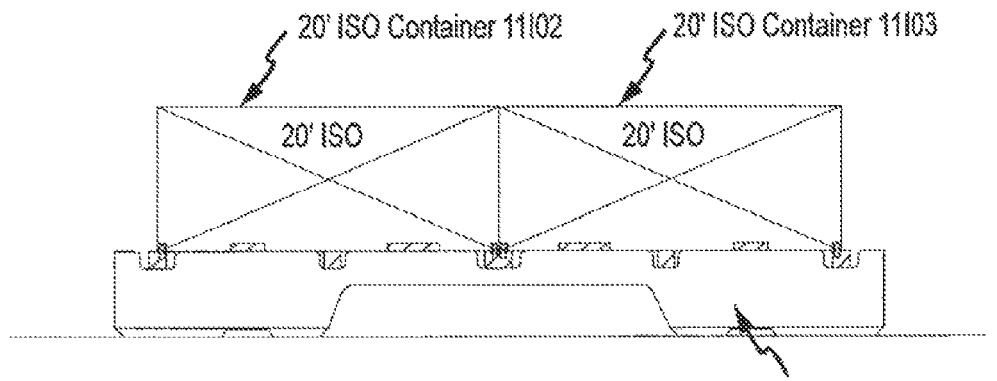
Figure 11J:
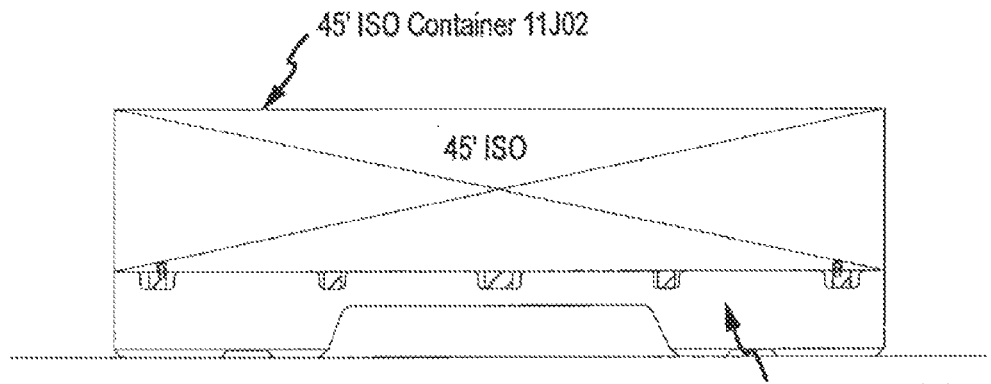
Figure 11K:
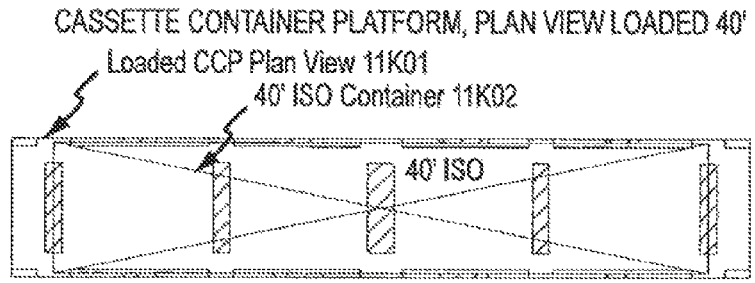
Figure 11L:
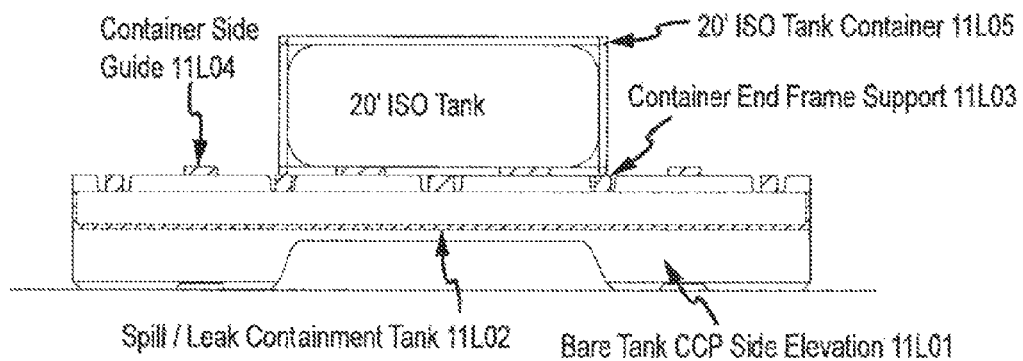
Figure 12A:
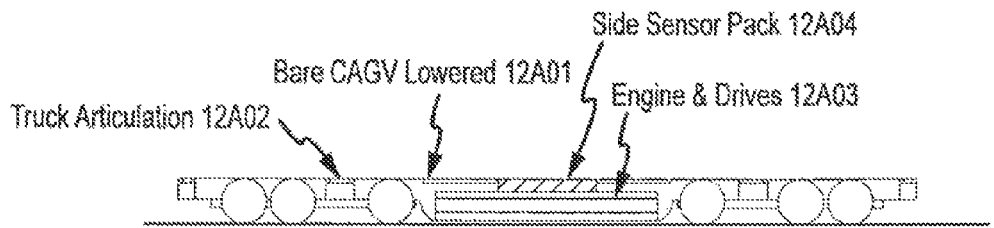
FIGS. 12A through 12E, Cassette AGV, show side and planned views of an exemplary configuration of a Cassette AGV, consistent with the CCP shown above. The figures show the CAGV in raised or lowered mode, with or without CCPs aboard.
Figure 12B:
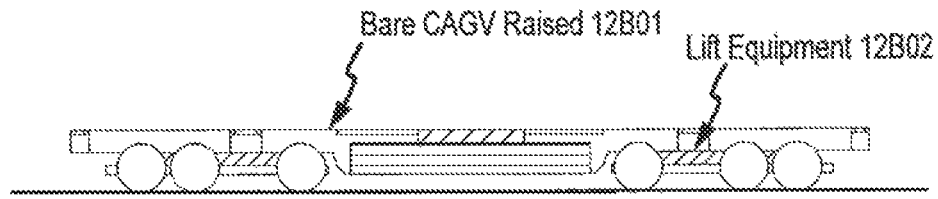
Figure 12C:
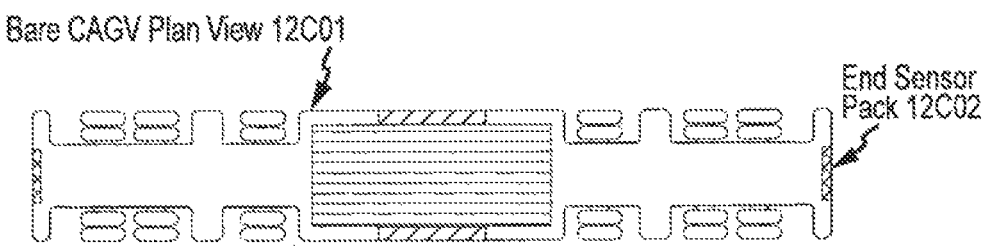
Figure 12D:
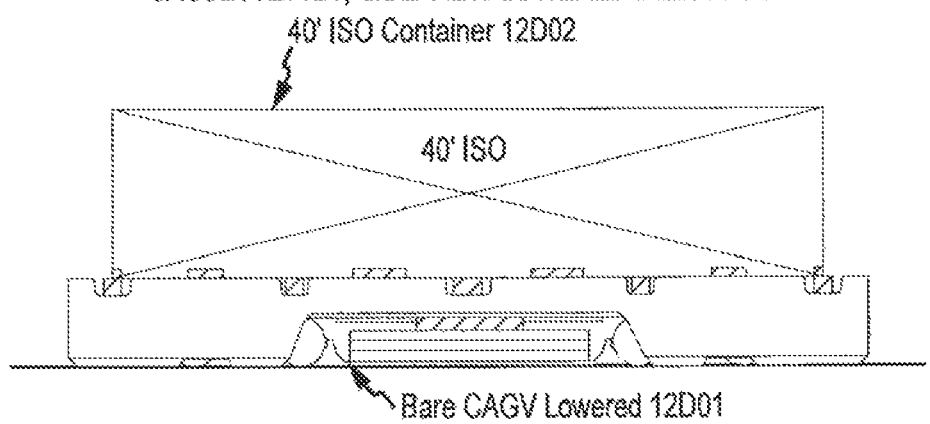
Figure 12E:
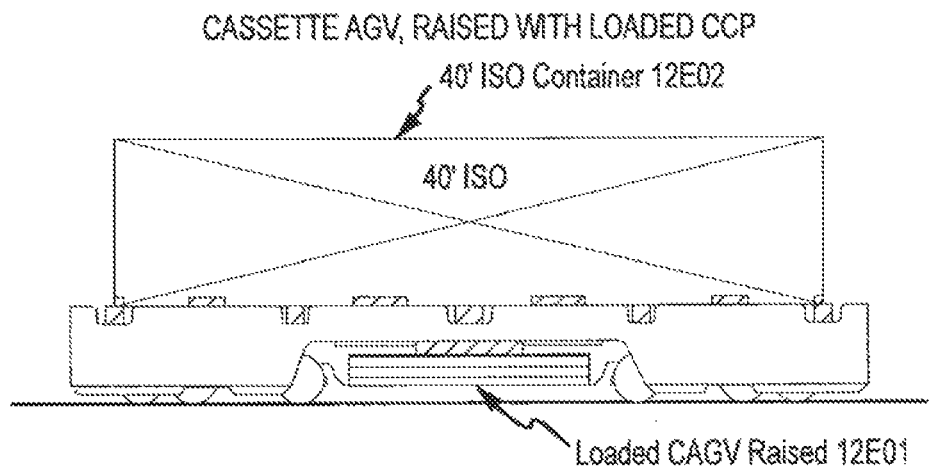

There are two configurations for ASCs currently in use: "common-rail" and "nested-rail", as described above. FIGS. 8 and 9 depict the typical storage block layouts for these two configurations.

In the common-rail ASC configuration, the two ASCs within each block 0803 ride on a common set of gantry rails. The landside ASC 0805 transports containers between the storage block 0803 and the ASC/truck interface 0802. The waterside ASC 0806 transports containers between the storage block 0803 and the ASC/AGV interface 0804. As the two ASCs are on common rails, they cannot pass one another. At the waterside end of the block, it is possible to establish a "double-depth" ASC/AGV transfer, so that the landside ASC 0805 can actually reach a waterside AGV. However, this is a low-productivity move because the waterside ASC 0806 must stand idle while this is happening.

There is typically a maintenance access lane 0807 between adjacent ASC blocks, allowing workers to enter the ASC zone from the landside to service cranes and gain access to refrigerated containers. This access lane is blocked at the waterside end.

In the nested-rail ASC configuration, the two (or more) ASCs within each block 0903 ride on two sets of parallel rails. A small ASC 0905 rides on a narrow-gauge pair of rails, while a large ASC 0906 rides on a larger-gauge pair of rails. The large ASC 0906 is both wider and taller than the small ASC 0905, so the two ASCs can pass one another and serve either end of the block. In passing, the suspended ropes, head block, spreader, and container of the large ASC would interfere with the small ASC. See FIG. 10 for a cross-section of the nested-rail crane configuration. To prevent interference while passing, the large ASC's trolley 1006 is positioned over a passing lane 1007 that lies outside the gauge of the small ASC. Maintenance access 0907 is similar to that for the common-rail configuration, but workers must cross gantry rails to serve both machines. Inclusion of two additional rails and the passing lane 0908 means that the overall storage density of the nested-rail system is significantly less than that of the common-rail system. However, because both ASCs can serve either transfer area, the productivity of this configuration is believed to be higher.

Figure sets 11 through 27 depict the essential innovative elements of the invention and their relationship to one another to create the innovative system.

FIGS. 11A through 11L show the Container Cassette Platform (CCP) in various views and operating configurations, an innovative adaptation of existing palette and cassette technologies. The bare CCP 11A01/11B01/11C01 is a simple structure designed to support ISO containers for transport. The CCP supports containers along their side and end rails, rather than at their corner castings as has been traditional. The side rails 11C02 support the container side frames. The end frame rails 11A02/11B02 support the container end frames. When a container is being set onto the CCP, it is guided laterally by flared side guides 11A02. These guides also restrain the container during transit. The CCP has pockets 11A04 in the support rails where the container corner castings sit. This allows containers to be set on the CCP with inter-box connectors or "cones" inserted into their corner castings, and allows workers to reach in to install or remove cones while the CCP is at rest. The CCP is configured to carry either: 1) a single 40' ISO container 11G02/11K01; 2) a single 20' ISO container 11H02; 3) two 20' ISO containers end-to-end 11I02; or 4) a single 45' intermodal container 11J02. A variant of the CCP, not shown, is configured to carry 48' or 53' non-ISO or other specialized containers deployed in the terminal's marketplace. The CCP is also configured to allow multiple CCPs to be stacked 11E01/11F01. The CCP is supported along the bottom edge of its side frames. A gap 11A05 in each side frame provides visibility for the instruments in the CAGVs navigation package 12A04. The CAGV drives beneath the CCP 11C04 from either end, and lifts it for transport. The CCP is equipped with lifting castings 11B03 that allow the CCP to be lifted with a standard telescopic container spreader, FIG. 30A. A variant embodiment of the CCP 11L01 is built to hold the container 11L05 higher off the ground, and the extra space is used to incorporate a sealed holding tank 11L02 that can contain accidental spills or leaks from containers, including ISO tank containers and other containers holding freight that might drip or leak.

FIGS. 12A through 12E show the Cassette Automated Guided Vehicle (CAGV) in various views and operating configurations. The CAGV is a low-profile multi-axle machine designed to pick, set, and transport CCPs and CWPs. The CAGV can move in two modes or configurations: Lowered 12A01/12D01 and Raised 12B01/12E01. Lift equipment 12B02, likely either hydraulic or electric, raises the CAGV to pick a CCP or CWP for transport, or lowers the CCP or CWP back to the ground for container interchange or other operational deployment. All axles are steerable through a common articulation 12A02, allowing the CAGV to maneuver "rotating from its center" for maximum flexibility. Engines and drives 12A03 are beneath the CAGVs upper support bed. Navigational sensors 12A04 may be located on either side of the CAGV, with visibility through the space in the side frame of the CCP 11A05 or CWP 18A02. Anti-collision sensors 12C02 are located in each end of the CAGV, integrated into the CAGV's on-board control system to prevent collisions with mapped or unmapped objects in the ROZ.

Figure 13A:
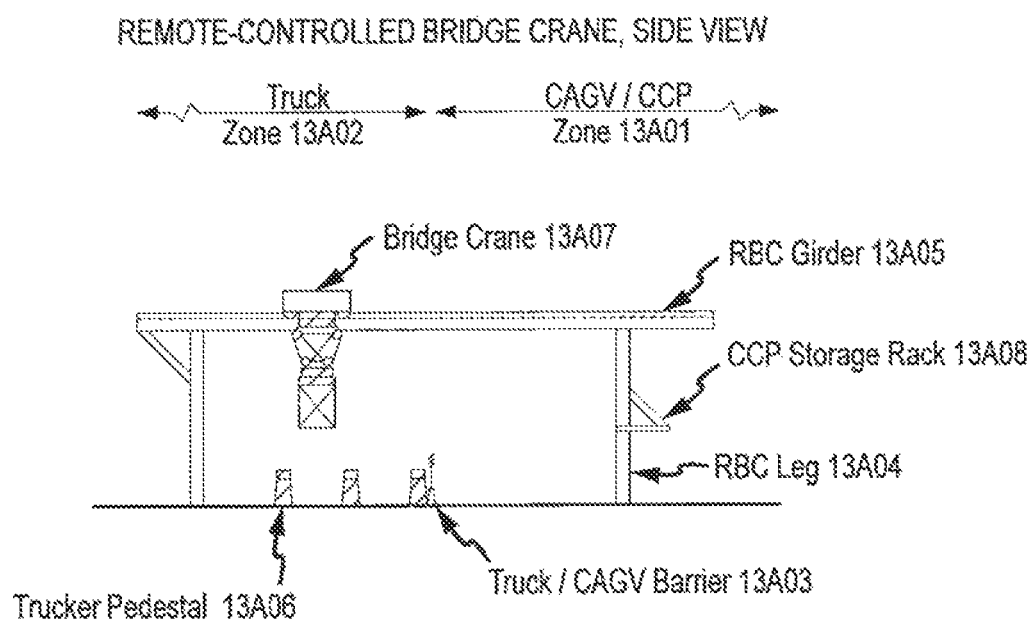
FIGS. 13A through 13C, Remote-Control Bridge Crane, show side, plan, and end views of an exemplary configuration of an RBC that could be used to transfer containers between CCPs and street trucks across the safety barrier delimiting the robotic transport zone of the terminal.
Figure 13B:
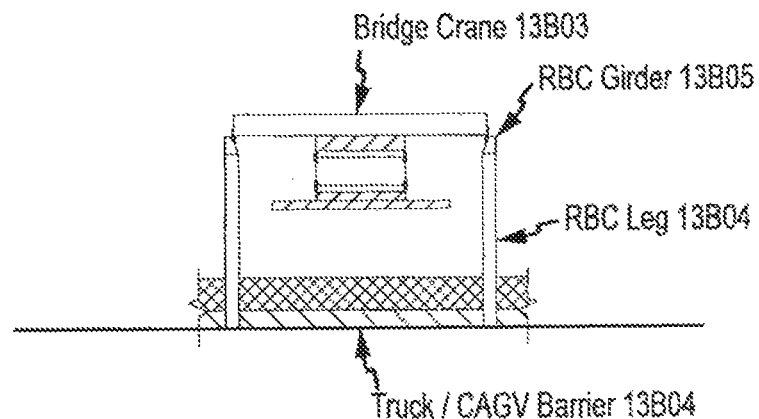
Figure 13C:
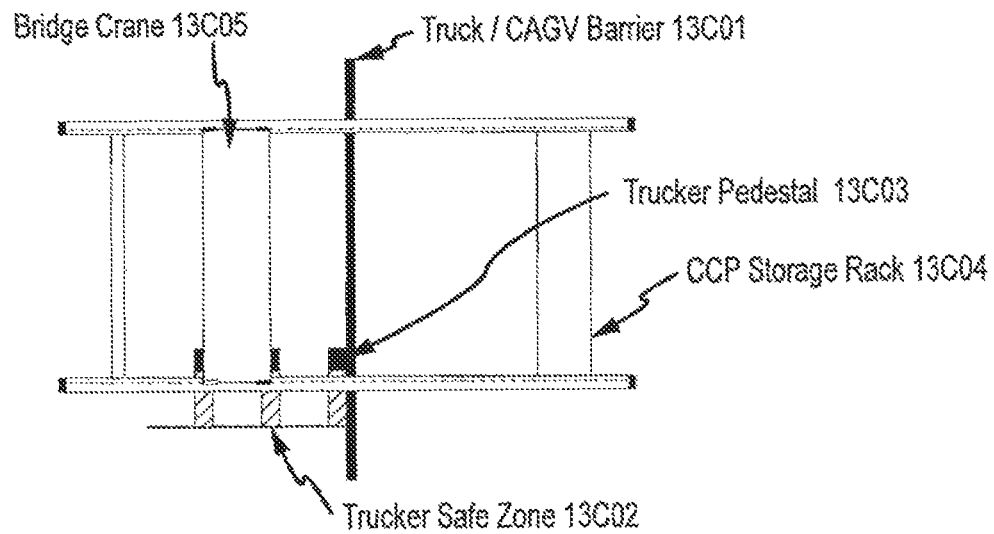

FIGS. 13A through 13C show side, end, and plan views of the configuration of the Remote-controlled Bridge Crane (RBC), used to transfer containers between CCPs on the edge of the ROZ 13A01 and street trucks in the TCA 13A02. Trucks are separated from the ROZ by a barrier 13A03/13B04/13C01 that provides both a physical and a freight security boundary; additional barriers may be placed between the truck lanes to control trucker movements while in the interchange area. Upon arrival beneath the RBC's fixed frame 13A04/13A05, a street trucker will exit the truck cab, stand in the safety zone 13C02 and check in at the data pedestal 13A06/13C03, then await container interchange. The RBC 13A07/13B03/13C05 will operate in automated mode while picking or setting containers on the ROZ side of the barrier 13A03. The RBC 13A07 will be under the remote control of a human operator while moving, picking, or setting containers on the TCA side of the barrier 13A03. The RBC will be equipped with cameras providing a clear view of the truck zone 13A02 to the remote operator, and with traditional safety interlocks that prevent accidental lifting of the truck chassis. The RBC's frame has a storage rack 13A08/13C04 to hold one or more empty CCPs, allowing flexibility in RBC utilization and CCP deployment. See the discussion on Figure set 23 below for further detail on the interaction between RBCs, CCPs, and trucks.

Figure 14:
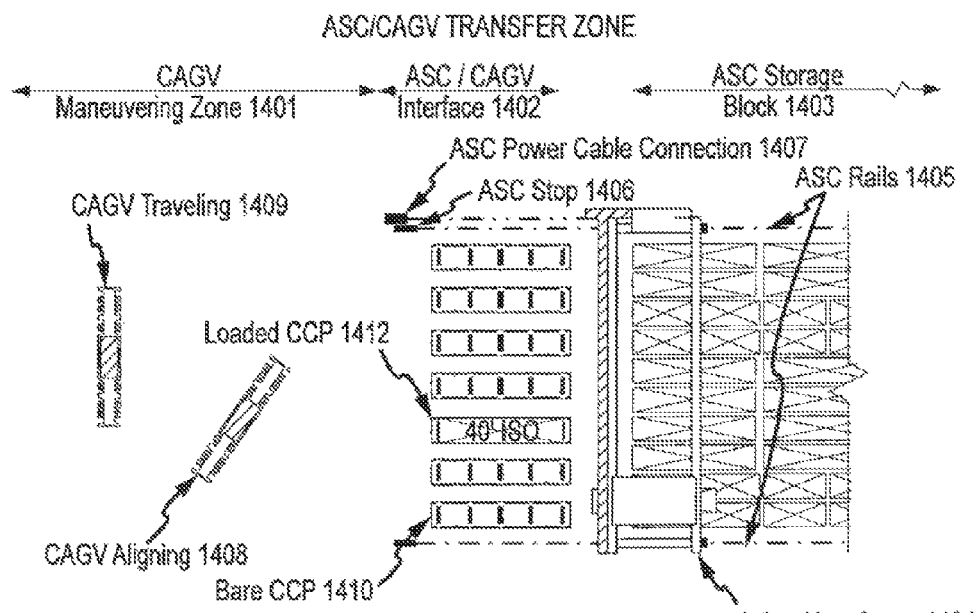
FIG. 14, ASC/CAGV Transfer Zone, shows an exemplary configuration of the transfer zone at either end of an ASC block served by CAGVs and CCPs.

FIG. 14 shows the interface buffer zone for transfer of containers between ASCs, CAGVs, and CCPs. It is similar in general concept to the ASC/truck interface buffer zone depicted in FIG. 7, but with some essential differences. As an example of the utilization of this zone, consider the "deliver container to CCP" transaction. A CAGV 1408 delivers a bare CCP 1410 to one of the slots in the interface zone 1402. When the container is needed, the ASC 1404 retrieves the container from the storage block 1403 and, still under robotic control, moves along the gantry rails 1405 all the way into the interface zone 1402. The ASC sets the container on the CCP 1410 and is then ready for another transaction. The ASC is under robotic control at all times, with no interruption for transition to remote control by a human operator. The interaction between the moving CAGV(s) and the ASC is entirely under the control of the ECS, and no special safety interlocks or barriers are required to protect either machine or the CCPs.

Figure 15:
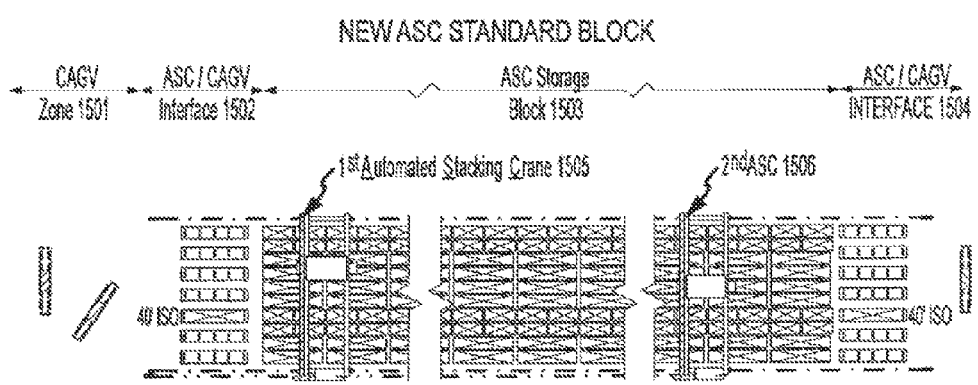
FIG. 15, New ASC Standard Block, shows an exemplary configuration of a complete ASC storage blocks serving CAGVs and CCPs.

FIG. 15 shows the general configuration of an exemplary ASC block incorporating the ASC/CAGV interface buffer zone shown in FIG. 14. As the CAGVs are free to access either end of the ASC block 1503, moving freely throughout the Robotic Operating Zone, there is no need to use the "nested rail" block configuration. Both ASCs 1505 and 1506 ride on a common set of gantry rails. The two interface buffer zones 1502 and 1504 are identical. Rather than "landside" or "waterside" ASCs, as shown in FIG. 8, the ASCs are simply labeled "first" and "second", as either ASC can serve waterside or landside operations, with the CAGVs moving anywhere in the ROZ. The block width and length shown are exemplary; in actual application, these dimensions will be set based on operational analysis that balances the productivities and duty cycles of all machines within the specific context of each terminal's overall layout.

Figure 16A:
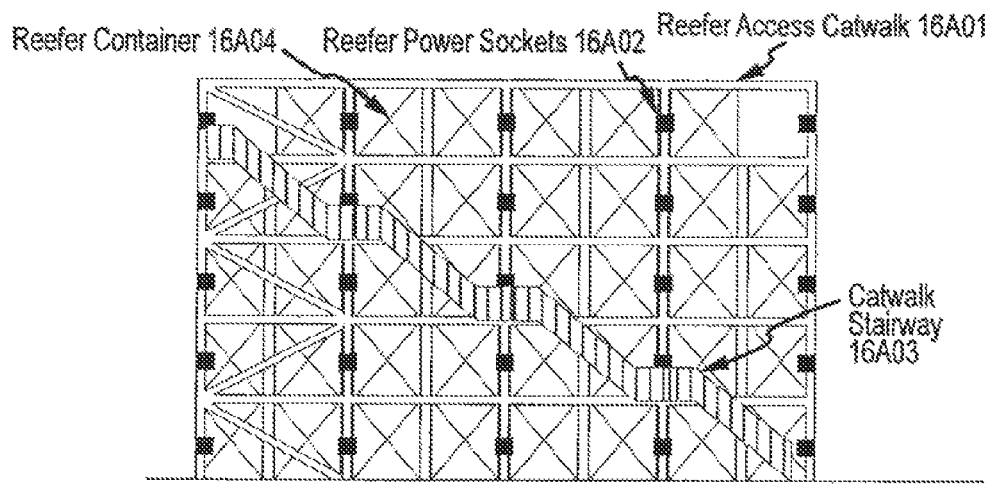
FIGS. 16A and 16B, Refrigerated Container Storage and Access, show side and end views of an exemplary configuration for reefer access racks within the exemplary ASC Standard Block.
Figure 16B:
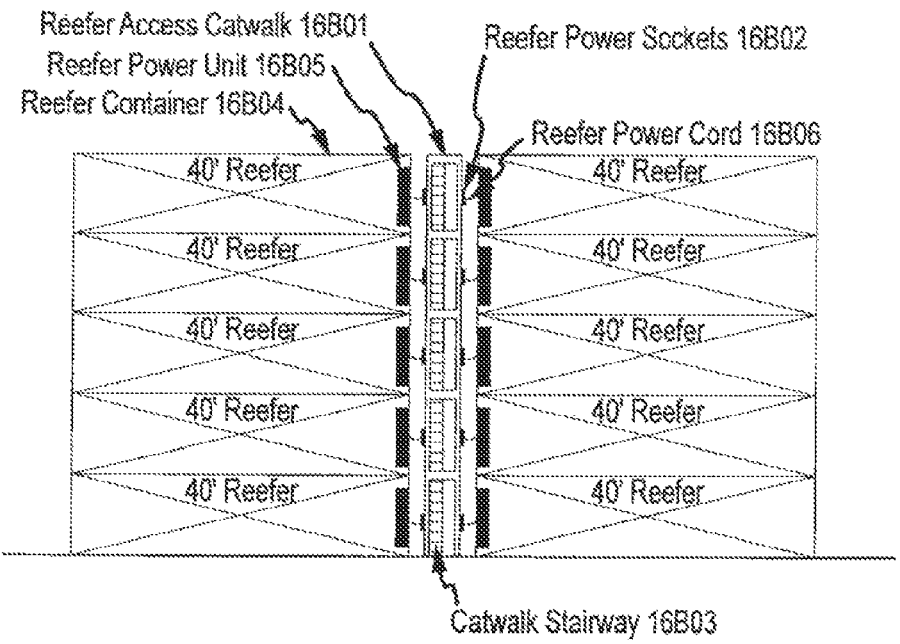

FIGS. 16A and 16B show side and end views of an example configuration for storage of refrigerated containers. This configuration is not innovative, as it has been in use for some time in traditional manned container terminals. Each refrigerated container 16A04/16B04 has a power unit 16B05 built into the end opposite the container doors. This unit, which relies on external power, maintains the internal temperature of the container within a specified range that maintains the quality of the container's contents. When a container is placed into storage, a reefer mechanic must plug the power cord 16B06 into the power unit 16B05 and a power source 16A02/16B02, and verify that the temperature is, and has been, within the specified range. Prior to removing a container from storage, a reefer mechanic must unplug the power unit from the power source. The reefer access catwalk 16A01/16B01 is a structure that houses power sources 16A02/16B02, and allows reefer mechanics to gain safe access to the reefers for monitoring, plugging, and unplugging them. The catwalk is roofed to shelter working mechanics. Mechanics access each level of the catwalk via an internal stairway 16A03/16B03. Each level of the catwalk may be further subdivided by a safety gate so that the position of workers within the rack structure can be monitored more closely, for increased safety and flexibility. The reefer containers 16B04 must be oriented so that their power units are oriented toward the catwalk.

Figure 17:
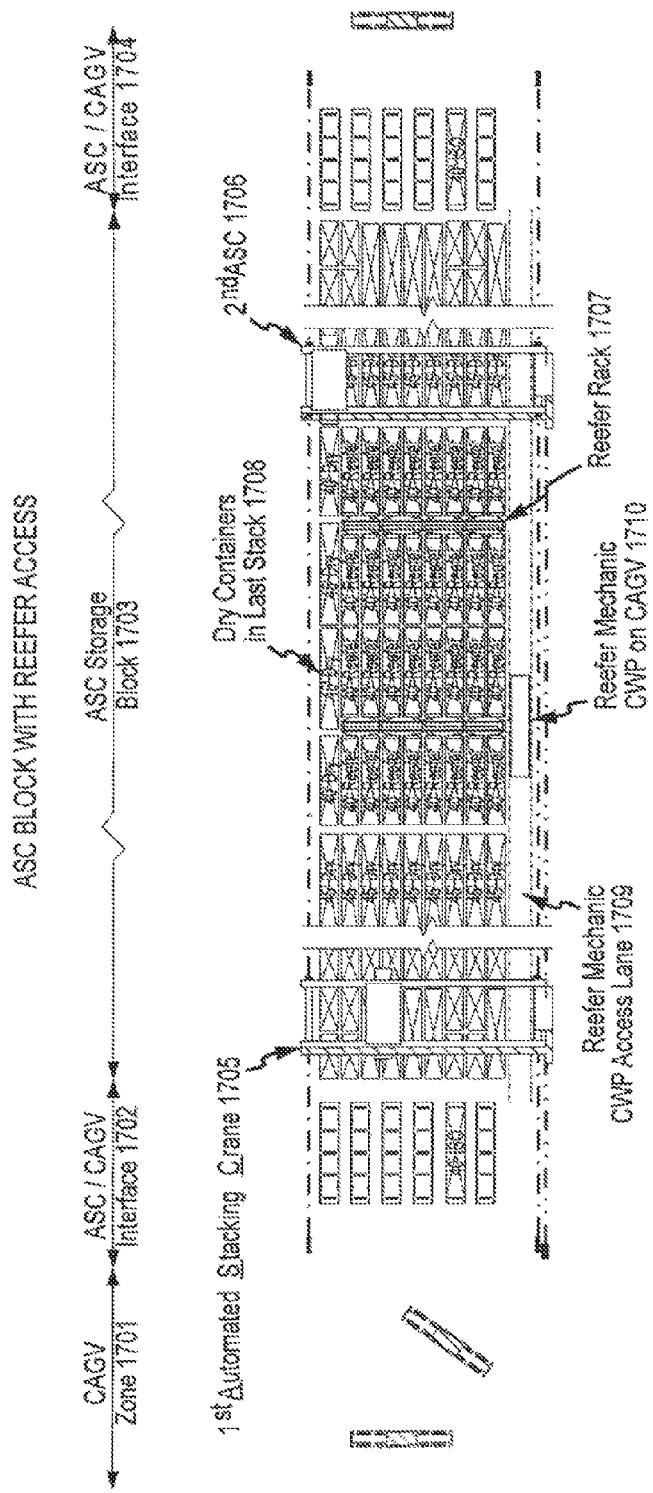
FIG. 17, ASC Block with Reefer Access, shows an exemplary configuration for an ASC storage block configured to accommodate storage for, and maintenance access to, refrigerated containers.

FIG. 17 depicts the configuration of an ASC storage block incorporating the reefer storage rack shown in Figure set 16. As with the standard ASC block shown in FIG. 15, two identical ASCs 1705 and 1706 ride on a common set of rails to store and retrieve containers in the storage block 1703, and to transfer containers to and from end interface buffer zones 1702 and 1704. While the ASCs have the same gauge as those in the standard ASC block, the container storage bays are narrower by one container stack. This leaves an access lane 1709 for reefer mechanics, carried by CWPs 1710, to be taken to and from the reefer racks 1707 embedded within the block. See Figure set 20 for a discussion of the reefer access CWP. The reefer racks would likely be placed in the center of the block, providing equal accessibility to CAGVs and CCPs at either end of the block, 1702/1704. The reefer racks 1707 do not span the entire block. Rather, one stack 1708 is reserved for non-refrigerated ("dry") containers. This configuration allows a container to be carried by an ASC 1705/1706 from one side of the reefer zone to the other, without the suspended load being carried over the head of any mechanic who may be accessing the rack. This maximizes safety for the mechanics with no loss of ASC block productivity. The CWP access lane 1709 can also be used for transit of CAGVs with or without CCPs or CWPs from one end of the block to the other. Instrumentation and controls on the ASCs, CAGVs, and CWPs, coordinated within the ECS, prevent unsafe interactions between ASCs and equipment transiting in the access lane 1709.

Figure sets 18 through 22 depict the innovative Cassette Work Platform and its essential variants. The CWPs are designed to allow the safe transport and deployment of workers and their tools and gear throughout the terminal, carried by the same CAGVs used to transport CCPs. The introduction of the CWP alleviates the need for the terminal's automation system to cope with the uncontrolled movement of workers within the Robotic Operating Zone. This simplifies the ECS, simplifies the configuration of the terminal, and allows centralized optimization of all equipment moves. It also allows optimized deployment and movement of workers by the TOS and ECS within the ROZ based on forecasted transactional needs. Using CWPs separates workers from the utilization and operation of transport equipment, and reduces the variety and number of operational vehicles required to run the terminal to one: the all-purpose CAGV.

Figure 18A:
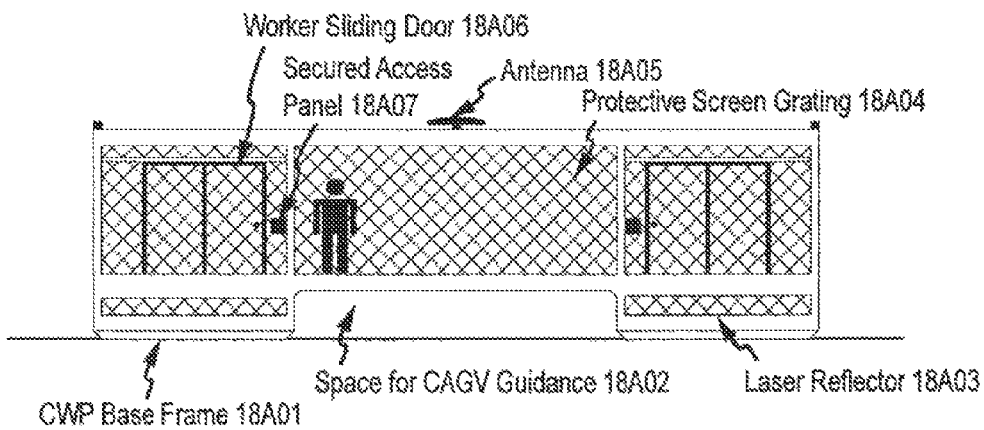
FIGS. 18A through 18C, Generic Cassette Work Platform, show side, plan, and end views of a configuration for a generic Cassette Work Platform that would be the template for a series of job-specific CWPs.
Figure 18B:
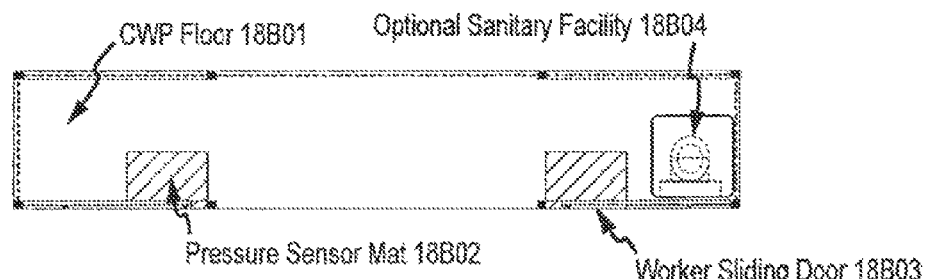
Figure 18C:
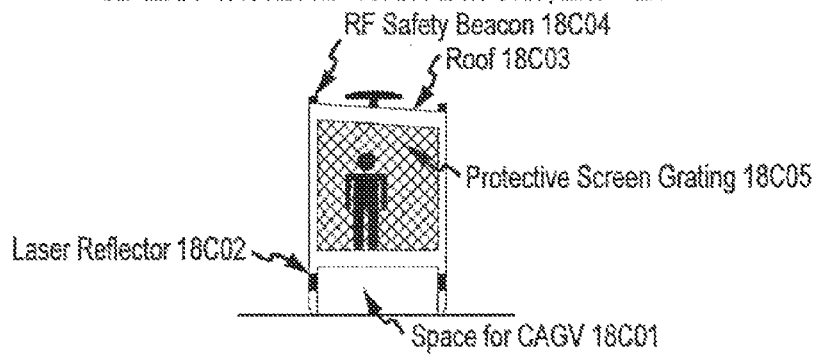
Figure 19A:
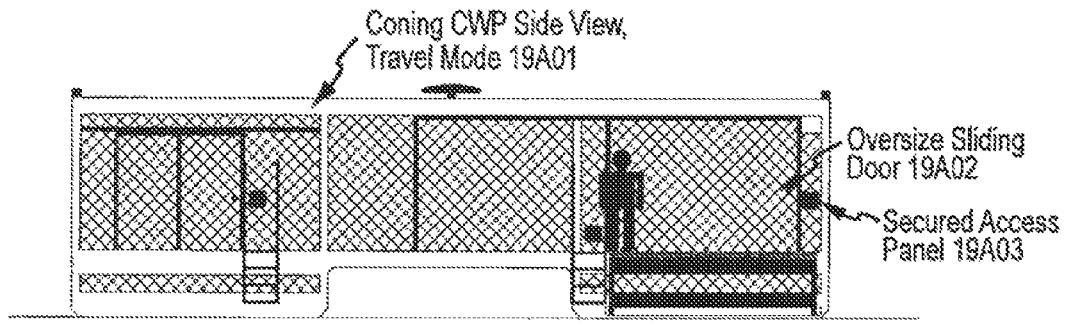
FIGS. 19A through 19F, CWP for Coning, show side, plan and end views of an exemplary configuration for a CWP designed to accommodate workers coning and deconing containers near the quay. The figures show the Coning CWP configured for transport, and in its configuration deployed for handling cones.
Figure 19B:
Figure 19C:
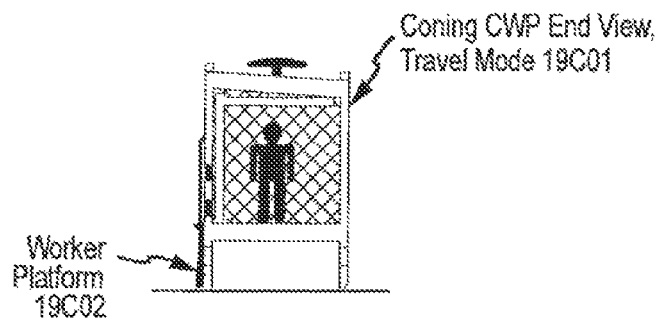
Figure 19D:
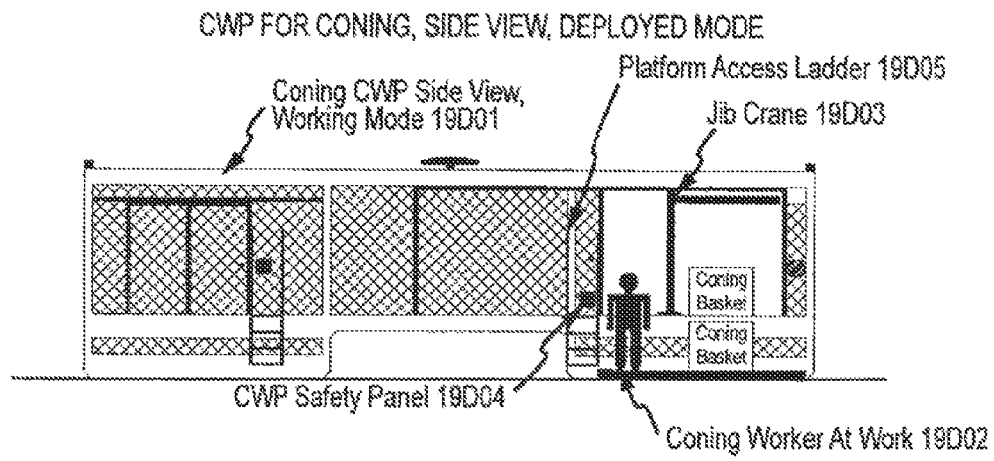
Figure 19E:
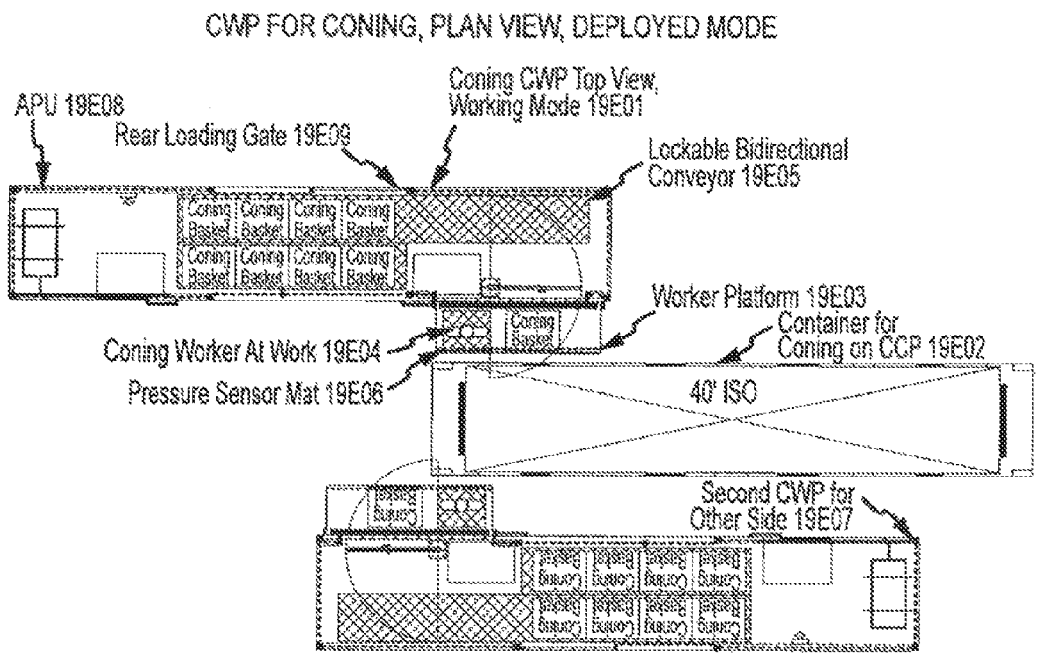
Figure 19F:
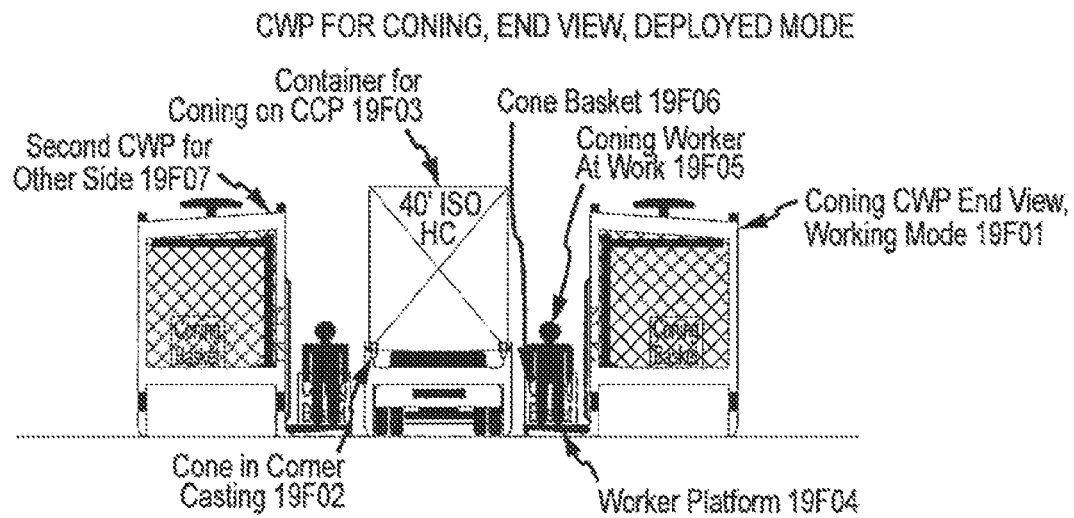

FIGS. 18A through 18C show the side, plan, and end views of the generic Cassette Work Platform that is the common basis for all variants of the CWP. The CWP base frame 18A01 has the exact same external dimensions as the CCP, including the side space for CAGV guidance 18A02, and the space beneath for CAGV access 18C01. Laser-reflective panels 18A03/18C02 are affixed to the side and end surfaces of the base frame, increasing the visibility of the CWP to anti-collision scanning lasers 12C02 on the CAGVs. The CWP has a roof 18C03 supported by columns, suitable to protect workers from environmental conditions and unforeseen overhead hazards. The CWP roof would have a unique radio-frequency safety locator device 18C04, allowing the CWP to be "seen" and mapped by external detectors. These devices and detectors are used to establish the precise location and orientation of the CWP and mapped within the ECS, and a "digital safety zone" can be correspondingly mapped around each CWP. The sides of the CWP are fitted with protective screen gratings 18A04/18C05. These prevent accidental physical interaction between workers inside the CWP and operations outside the CWP, while maximizing visibility for workers inside. A broadband data antenna 18A05 is affixed to the roof of the CWP, to support data interchange between the CWP and the ECS or TOS. Access to the CWP is via sliding doors 18A06/18B03 at either end of one side of the CWP. Opening a door requires a worker to swipe a proximity card at a secured access panel 18A07. The secured access panel is part of a suite of instrumentation, including pressure-sensitive mats 18B02 and infrared beam sensors, that record and report worker entrances and exits, and report CWP occupancy via the data antenna 18A05. Unlike the Cassette Container Platform, the CWP can be powered, either from a fixed source built into the terminal infrastructure, or from power/data connectors built into the top of the CAGV. The CWP can be equipped with storage batteries or an auxiliary fueled power unit to provide energy for on-board data and mechanical systems. The CWP can be equipped with optional worker sanitary facilities as well as serviced when the CWP is not in use. While the CWP is being transported by a CAGV, there is a direct data connection between the top of the CAGV and the underside of the CWP, allowing workers on the CWP to demand an emergency CAGV stop, or to otherwise interact with CAGV instrumentation.

FIGS. 19A through 19F show the side, plan, and end views, in "transport" and "deployed" modes, of the innovative CWP designed to accommodate workers inserting and removing inter-box connectors, or "cones", at container corner-castings. Cones are used to hold containers together above-deck on container vessels, and are used to secure between the two tiers on double-stack intermodal rail cars. The Coning CWP is based on the Generic CWP shown in Figure set 18, and shares the basic features of that base design, with one of the access doors replaced by an oversize sliding door 19A02. Coning and de-coning the corner castings 19F02 will take place with containers mounted atop a CAGV+CCP 19F03/19E02. At this elevation, the cone is at about floor height on the CWP. In order for the worker to move the cone comfortably and safely, the worker will need to be standing at or near ground level next to the container. The Coning CWP is equipped with a fold-down worker platform 19C02/19E03/19F04 that can hold a worker 19D02/19E04/19F05 as well as the coning "basket" 19F06 that is ordinarily used to store cones while not in use. Once the CWP has been positioned by a CAGV, a worker inside the CWP activates the machinery for lowering the platform 19D02, and opens and secures the oversize sliding door 19A02 after activating the access panel 19A03. Lowering the platform causes the CWP to communicate with the ECS regarding the change in the shape and size of the CWP, so that CAGVs moving in the ROZ can avoid the CWP. The worker positions a coning basket 19F06 on the conveyor 19E05 beneath the basket-lift crane 19D03, and then uses the crane to transfer the coning basket to the work platform 19D02. The worker then steps down the access ladder 19D05 onto the platform's safety sensor mat 19E06, reaches in through the doorway, and uses the safety panel 19D04 to advise the ECS that the CWP is ready for operation. Effective coning will require deployment of a second CWP 19E07/19F07, oriented and positioned for safe coordination between the coning workers. Once the CWPs are in place, a CAGV carrying a container on a CCP 19E02 can enter the gap between the CWPs, stopping with the forward end of the container aligned with the worker platforms based on the length of container associated with the CAGV in the ECS. Once the CAGV is in place and at rest, the ECS activates an indicator on the safety panel 19D04 telling the workers that the coning can proceed. The two workers transfer forward cones between the container and the coning basket, then each indicates on the safety panel 19D04 that the CAGV can be moved. Once the ECS knows that the CAGV can safely be moved, the CAGV is advanced so that the rear end of the container is aligned with the workers, and the ECS again indicates on the safety panel 19D04 that coning can proceed. Once the rear cones are transferred, the workers again use the safety panel 19D04 to indicate to the ECS that the CAGV can be safely moved, and the CAGV+CCP+container leaves the coning station. Workers use the crane 19D03 to transfer full or empty baskets between the worker platform and the storage conveyor inside the CWP as needed. An auxiliary power unit 19E08 will likely be needed for this CWP. The stock of coning baskets in the CWP can be changed by taking the CWP, on a CAGV, to a secure/safe transfer gate at the edge of the ROZ, where the rear sliding gate 19E09 can be opened and a forklift truck can be used to transfer coning baskets on or off the CWP's conveyor.

Figure 20A:
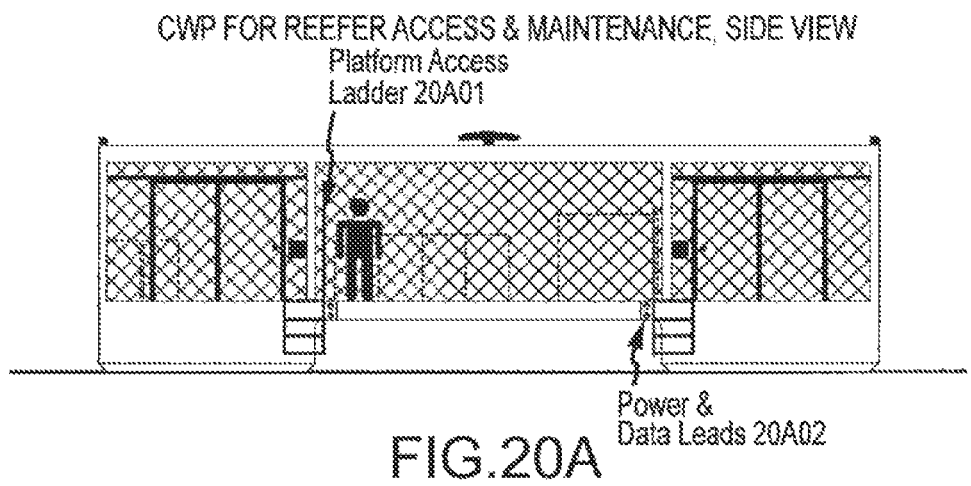
FIGS. 20A and 20B, CWP for Reefer Access and Maintenance, show side and plan views of an exemplary configuration for a CWP designed to accommodate mechanics accessing the reefer storage blocks for plugging and unplugging reefers, and for routine reefer maintenance.
Figure 20B:
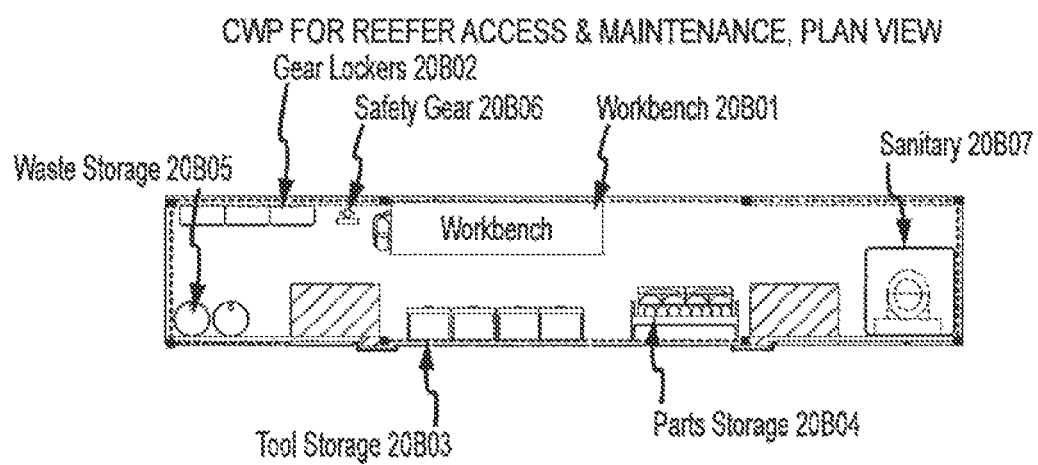

FIGS. 20A and 20B show the side and plan views of the innovative CWP designed for mechanics to access and service refrigerated containers in the reefer storage blocks shown Figure sets 16 and 17. The CWP is based on the Generic CWP shown in Figure set 18, and shares the basic features of that base design. Mechanics enter or exit the CWP via the standard secured doors and the access ladders 20A01. The CWP would be equipped with all the tools and fixtures needed for mechanics to carry out their functions in the reefer storage area. These might include a workbench 20B01, lockers 20B02 for storing their work clothing and gear, storage 20B03 for tools and equipment, and storage bins 20B04 for spare parts needed to make minor reefer repairs. The CWP might also include storage containers for routine or hazardous waste 20B05. The CWP would include basic safety gear 20B06, and might include worker sanitary facilities 20B07. While deployed at a reefer storage block, the CWP would be attached via power and data leads 20A02. This CWP would essentially be a low-scale portable workshop for reefer mechanics.

Figure 21A:
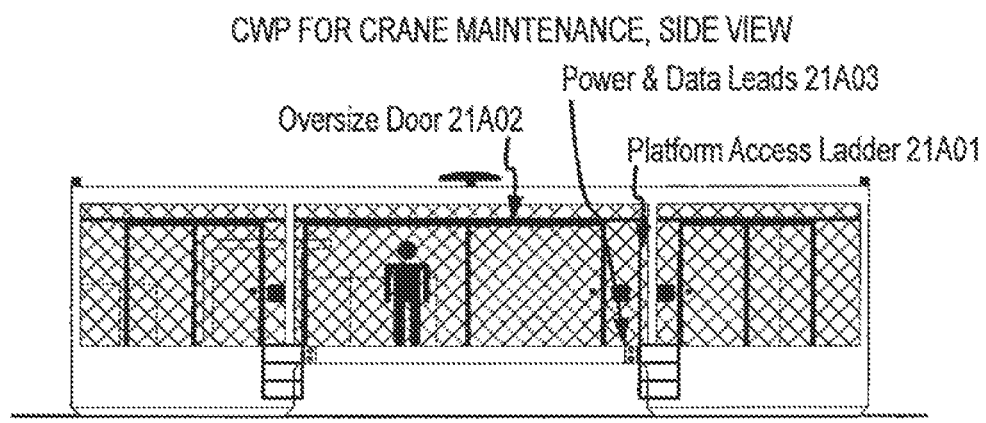
FIGS. 21A and 21B, CWP for Crane Maintenance, show side and plan views of an exemplary configuration for a CWP designed to accommodate mechanics accessing the container yard for maintenance and repair of ASCs.
Figure 21B:
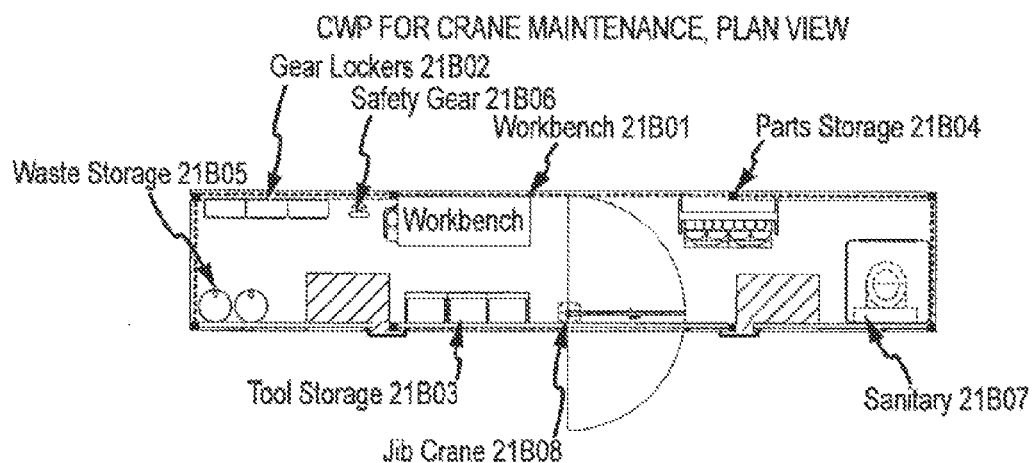

FIGS. 21A and 21B show the side and plan views of the innovative CWP designed for mechanics to access and service ASCs in the Robotic Operating Zone. The CWP is based on the Generic CWP shown in Figure set 18, and shares the basic features of that base design. Mechanics enter or exit the CWP via the standard secured doors and access ladders 21A01. The CWP would be equipped with the tools and fixtures needed for mechanics to carry out basic maintenance and repair in the ROZ. These might include a workbench 21B01, lockers 21B02 for work clothing and gear, storage 21B03 for tools and equipment, and storage bins 21B04 for spare parts needed to make minor repairs. The CWP might also include storage containers for routine or hazardous waste 21B05. The CWP would include basic safety gear 21B06, and might include worker sanitary facilities 21B07. Because crane maintenance sometimes requires the movement of heavy objects into and out of the ROZ, the CWP would include an oversize door 21A02, through which a crane 21B08 can be used to transfer heavy objects into or out of the CWP. While deployed at crane maintenance stations within the ROZ, the CWP would be attached via power and data leads 21A03.

Figure 22A:
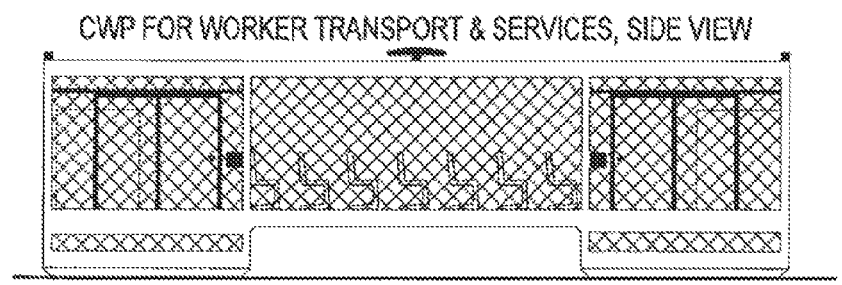
FIGS. 22A and 22B, CWP for Worker Transport and Services, show side and plan views of an exemplary configuration for a CWP designed to transport workers from point to point in the terminal, through the robotic transport zone.
Figure 22B:
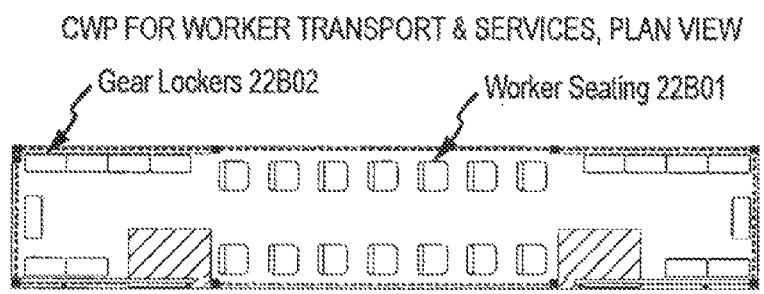

FIGS. 22A and 22B show the side and plan views of the innovative CWP designed for the transport of worker crews across the Robotic Operating Zone. The CWP is based on the Generic CWP shown in Figure set 18, and shares the basic features of that base design. Workers access this CWP at specific entry/exit points along the borders of the ROZ, and cannot exit the CWP elsewhere except in the case of an emergency. The CWP has lockers 22B02 to hold worker's clothing and work gear, and seating for workers to use while the CWP is being transported.

Figure 23A:
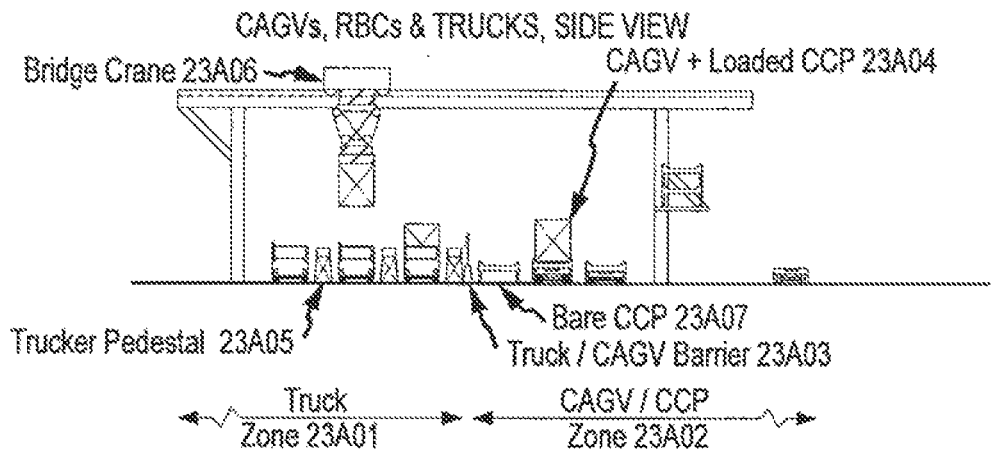
FIGS. 23A through 23C, CAGVs, RBCs, and Trucks, show side, end, and plan views of the operating relationships within the area where RBCs transfer containers between CCPs and trucks, and CAGVs transport containers to and from the RBC working zone.
Figure 23B:
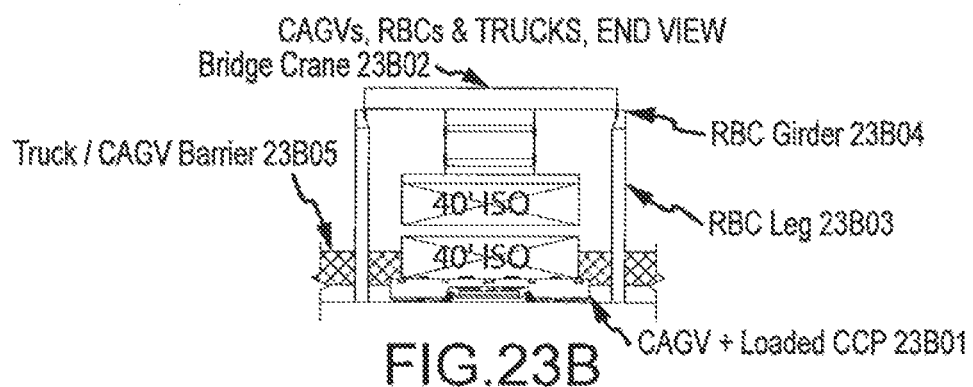
Figure 23C:
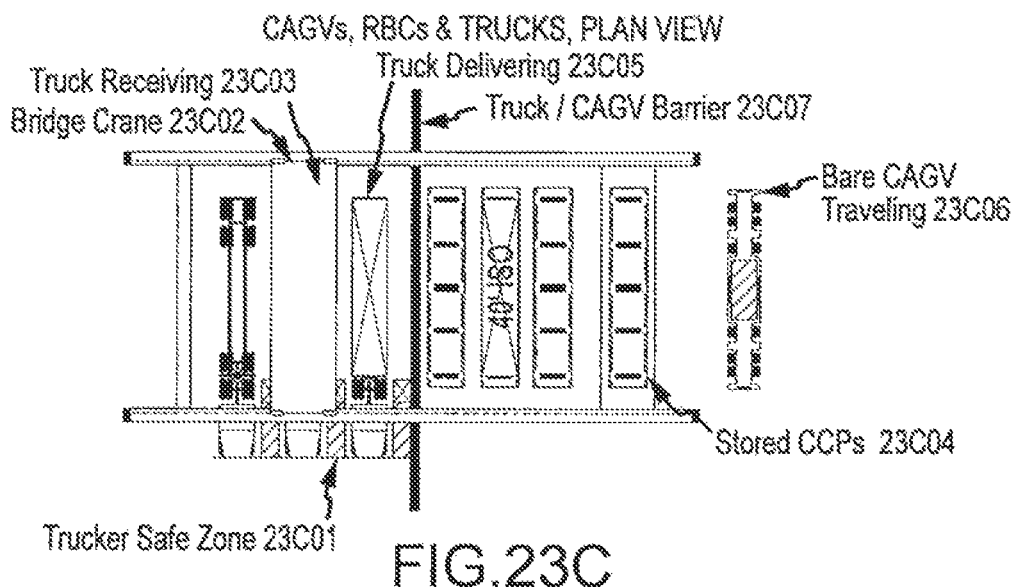

FIGS. 23A through 23C conceptually show the side, plan, and end views of the innovative interaction between Remote-controlled Bridge Cranes (RBCs), street trucks, CAGVs, and CCPs at the boundary between the Truck Circulation Area (TCA) and Robotic Operating Zone (ROZ). The figure depicts a single example RBC interchange station. The number and detailed configuration of such stations within any terminal would be a function of the terminal's specific needs and logistical balances. As described for Figure set 13, the RBC rides on a fixed structure that spans the safety barrier 23A03 between the truck zone/TCA 23A01 and the CAGV ROZ 23A02. When a trucker passes the gate complex to pick up a container, the TOS and ECS coordinate to have an ASC retrieve the target container from storage 1503 and deliver it to a CCP 1410 in the ASC/CAGV interface 1402. Once the container is placed on the CCP, a CAGV picks up the CCP. Meanwhile, the TOS and ECS coordinate to direct the driver to an RBC station based on a balance of optimized deployment of robotic equipment and high-quality service to the trucker. The ECS directs the CAGV to move the CCP to that RBC's CAGV/CCP zone 23A02. Once there, the CAGV sets the loaded CCP 23A04/23B01 beneath the RBC and reverts to ECS-driven deployment. Meanwhile, the trucker arrives in the RBC's truck zone 23A01, leaves the truck cab, and checks in at the trucker pedestal 23A05 using a data card tied to the specific transaction at hand. This registers the truck's specific parking slot with the ECS, and indicates the truck's readiness to receive its container. The trucker stands in the trucker safe zone 23C01 until the transaction is complete. Once the truck is in place in the truck zone 23A01, the ECS directs the RBC 23A06 to pick the container from the CAGV/CCP zone 23A02 and carry it to the safety barrier 23A03. At this point, control of the RBC reverts to control of a remotely-stationed operator. The operator has access to cameras and sensors mounted on the RBC 23A06/23C02 and controls the RBC as the container is set on the truck's chassis 23C03. The operator drives the RBC 23A06 back to the safety barrier 23A03 and RBC control reverts to the ECS. Once the RBC is clear of the truck, the trucker re-enters the truck and departs. Ultimately, the controls and sensors on the RBC can be improved to allow the RBC to execute automated pick/set operations against trucks, while being monitored by crane overseers.

The process for receiving a container from a trucker into the terminal is symmetric. The trucker arrives at the RBC and checks in. The RBC under remote control picks the container. The RBC under ECS control sets the container on a CCP pre-positioned by a CAGV. A CAGV arrives to pick up the CCP and transport it to the target ASC block. The CAGV sets the CCP down in the ASC transfer area. The ASC picks the container from the CCP and puts it in storage.

If the RBC's CAGV/CCP zone 23A02 becomes crowded with empty CCPs, the RBC 23A06 can pick up the CCP 23A07 by its lift casting 11B03 and store it on the CCP storage platform 23C04.

Figure 24A:
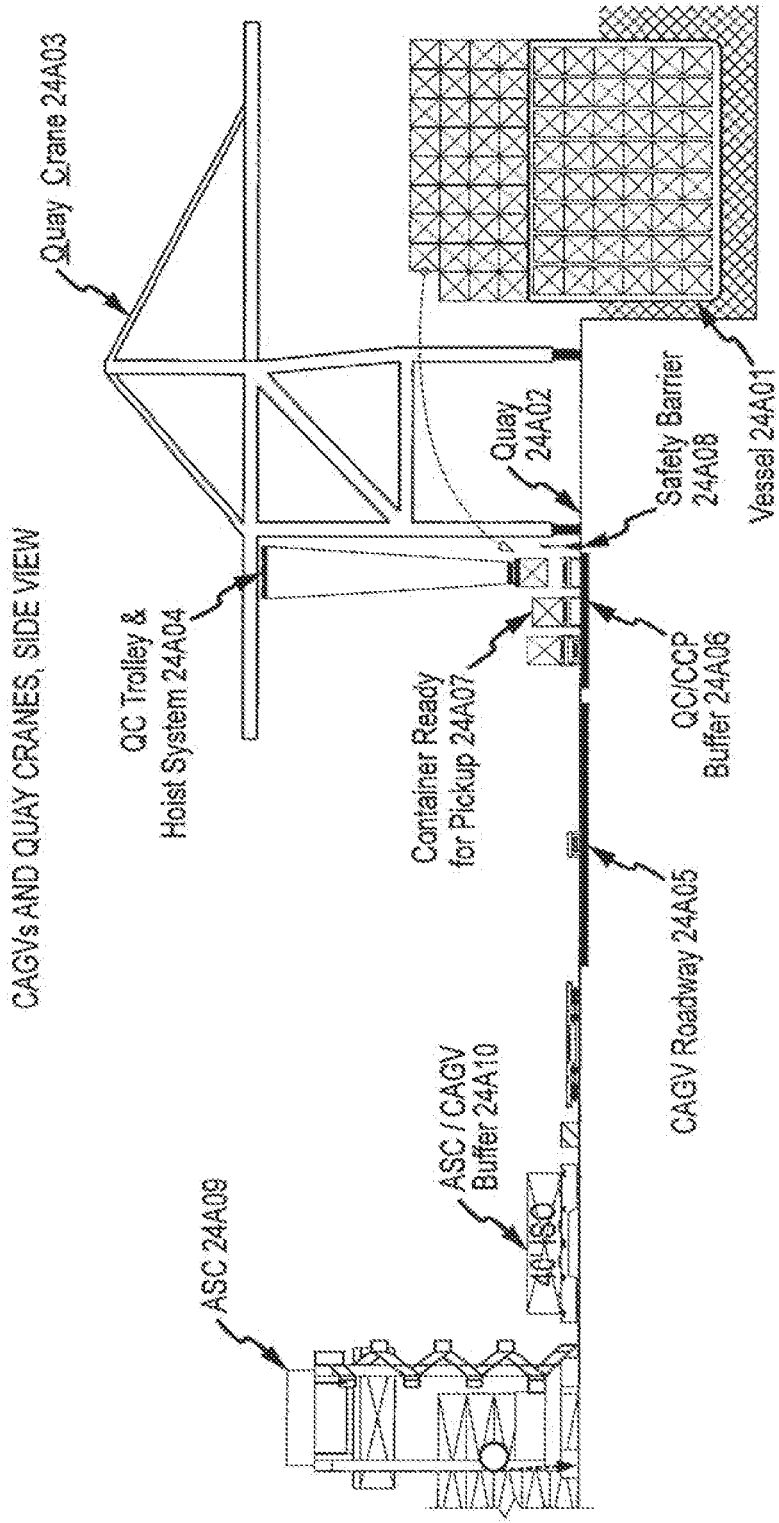
FIGS. 24A and 24B, CAGVs and Quay Cranes, show side and plan views of the operating relationships within the area where Quay Cranes transfer containers between CCPs and vessels, and CAGVs transport containers to and from the Quay Crane working zone and the Coning CWPs.
Figure 24B:
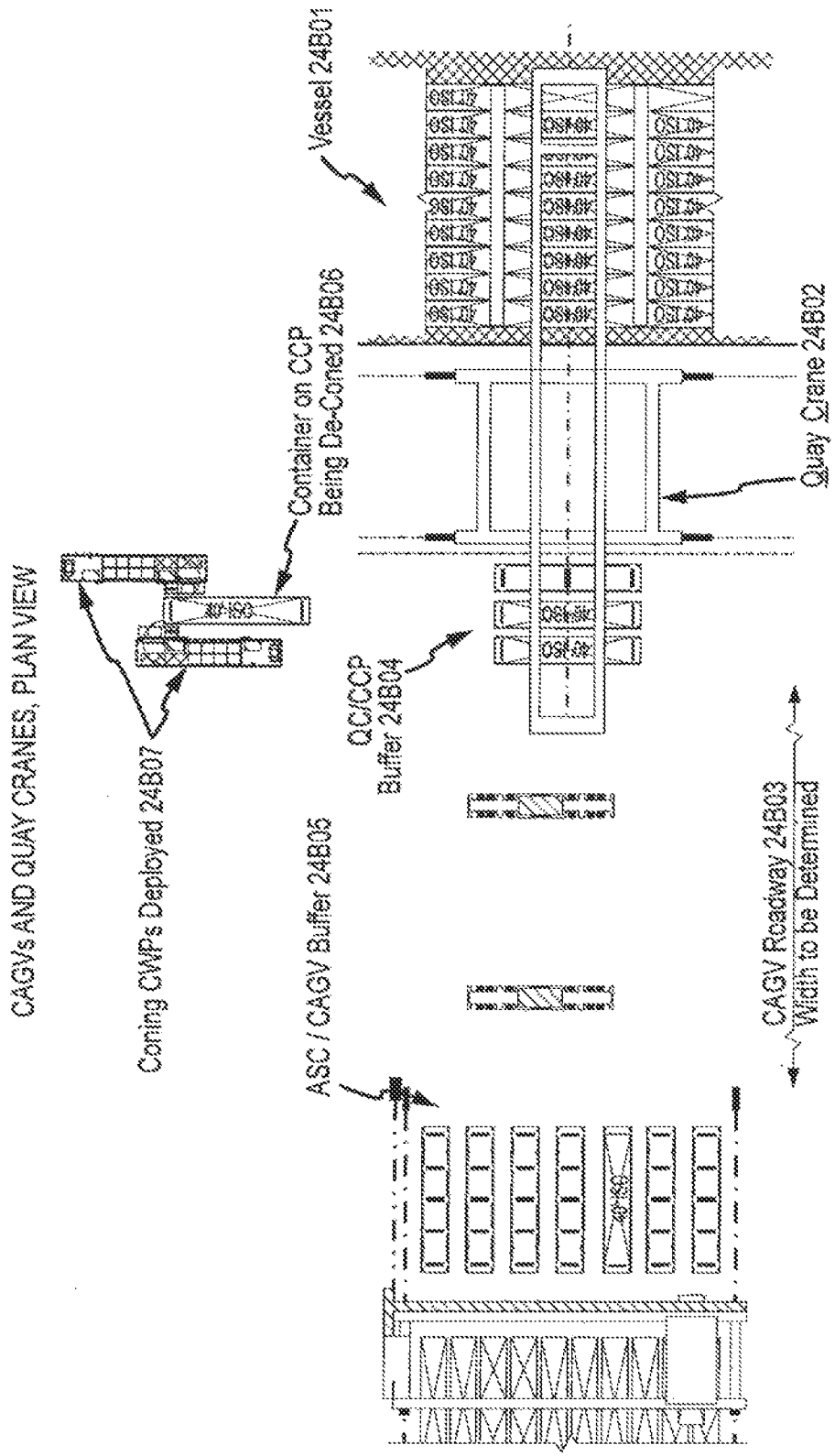

FIGS. 24A and 24B conceptually show the side and plan views of the innovative interaction between ASCs, CAGVs, CCPs, and quay cranes at the boundary between the Quay Operating Area (QOA) and the ROZ. Quay cranes 24A03/24B02 are responsible for transferring containers between vessels 24A01 and the quay crane operating envelope/CCP buffer area 24A06, across the quay 24A02. Quay cranes typically are engaged in extensive sequences of either pure vessel discharge or pure vessel loadout, in "single cycle" mode. They can also work in "double cycle" mode for containers in vertical cell guides on the vessel, alternatively loading and discharging containers. When discharging, CAGVs are delivering empty CCPs to the QC/CCP buffer zone 24A06, and taking away loaded CCPs 24A07 to the ASC buffers 24A10. When loading out, CAGVs are transporting loaded CCPs from the ASC buffers 24A10 to the QC/CCP buffer zone 24A06, and taking away empty CCPs. If a discharged container 24B06 has cones in its corner castings to be removed, the CAGV is routed through a coning station where workers in Coning CWPs 24B07 remove the cones as described for Figure Set 19. If a container to be loaded requires cones to be inserted before being placed on the vessel, the CAGV is routed through a coning station before moving to the QC/CCP buffer 24A06. The ROZ is separated from the quay operating area 24A02 by a safety barrier 24A08 providing physical and freight security for the ROZ and quay. As placement of CCPs by CAGVs in the QC/CCP buffer zone 24A06 will be precise, under the direction of the ECS, the quay crane's interface with CCPs in that zone may be automated under the control of the ECS, or remain under the control of the quay crane operator.

Figure 25A:
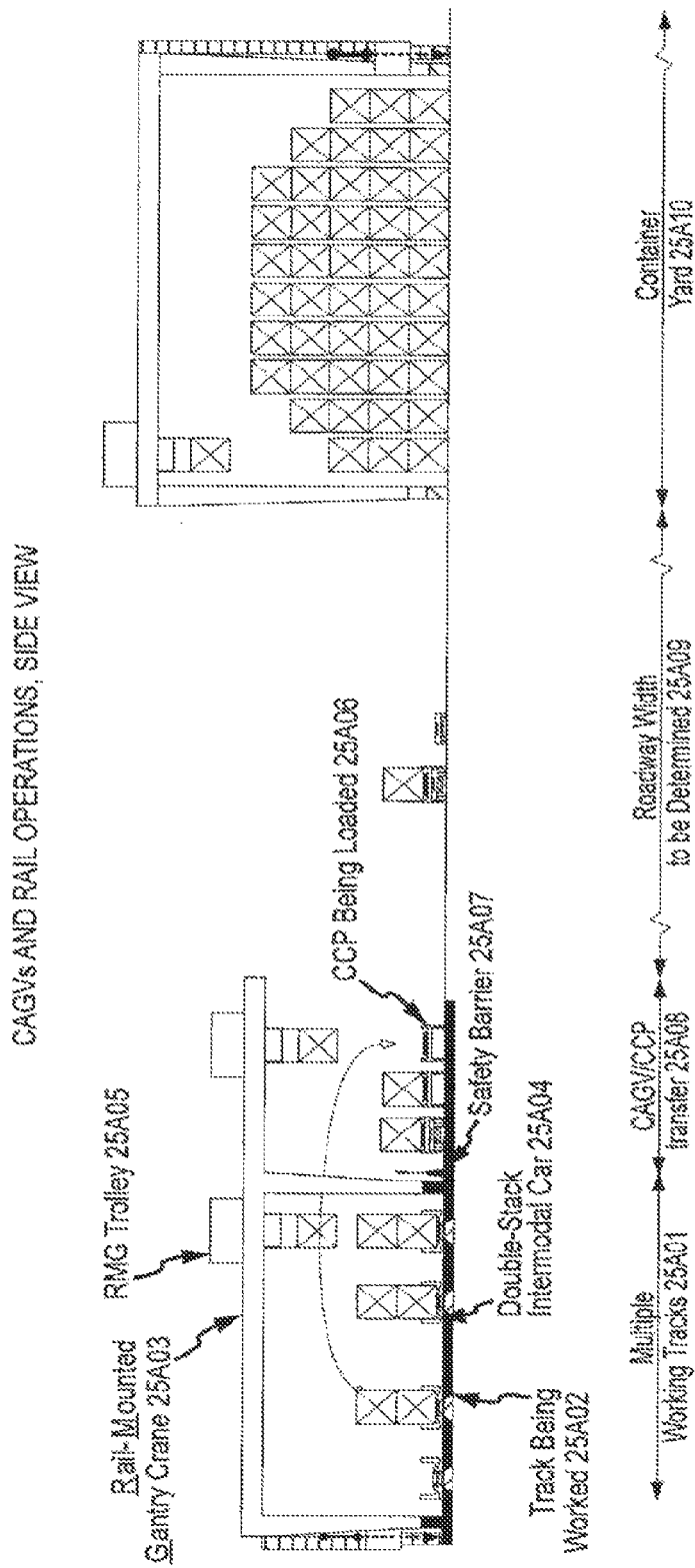

FIGS. 25A and 25B conceptually show the side and plan views of the innovative interaction between ASCs, CAGVs, CCPs, and RMGs spanning the boundary between the Rail Operating Area (ROA) and the Robotic Operating Zone. Intermodal rail cars 25A04 come in a very broad range of configurations, with different car lengths, platform sizes, and container transport capabilities. These cars are placed for discharge and reloading by locomotives on working tracks 25A02 in the rail operating area 25A01. Because of the randomness of car lengths and locomotive movements, cars on adjacent tracks do not align with one another. Train discharge and loadout is done with rail-mounted gantry (RMG) cranes 25A03/25B01 spanning the tracks, with a cantilever extending across the ROA/ROZ safety barrier 25A07 and over the CAGV/CCP transfer zone 25A08. Prior to train discharge, CAGVs 25B07 will bring empty CCPs and set them in the transfer zone 25A08. An innovative aspect of this activity is that the CCPs can be set starting at the "downstream end" and working upstream, with unloaded CAGVs driving beneath CCPs already placed downstream to cycle through the transfer zone. Once CCPs are ready to receive containers, the RMG 25B01 moves along the track, transferring containers from rail cars 25A04 to CCPs 25A06. Once a string of CCPs has been loaded, bare CAGVs arrive to pick up CCPs and transport them to the ASC/CAGV transfer zone 25B09, at either end of the target ASC block 25B08 as established by the ECS and TOS.

The sequence for train loadout is symmetric. CAGVs transport loaded CCPs to the CAGV/CCP transfer zone 25A08, aligning with target cars as closely as possible. RMGs load containers from CCPs to rail cars on the working tracks, and CAGVs return CCPs to storage or leave them for subsequent re-use for train discharge.

Figure 27:
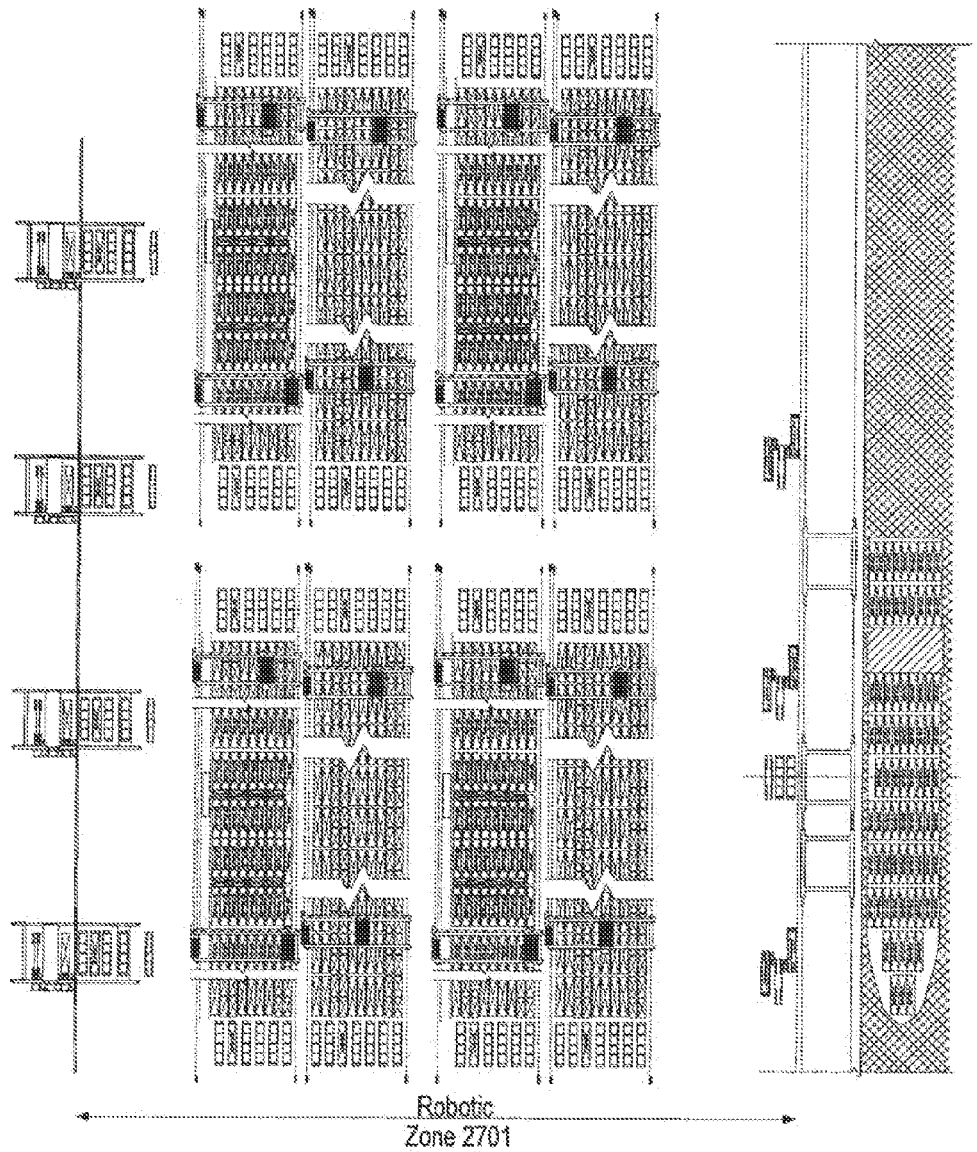
FIG. 27, Container Yard Parallel to Wharf, shows an exemplary layout of a container terminal with ASCs in a new configuration, running parallel to the quay with no loss of space, productivity, or capacity.

FIGS. 26 and 27 show two examples of how the various elements of the innovative system might be assembled into a complete container terminal, without an on-dock rail yard. These illustrations are meant to show the flexibility of the concept on terminals with fundamentally different dimensional characteristics.

FIG. 26 shows a container terminal layout with the ASC storage rows running perpendicular to the wharf. Standard ASC blocks alternate with those designed to accommodate reefer storage, but the ratios of different block types would likely vary from terminal to terminal without touching on the heart of the invention. RBC interchange blocks are shown along the landside edge of the terminal in close proximity to the landside ASC/CAGV interchange zones. Quay crane interchanges are similarly close to the waterside ASC/CAGV interchange zones. A typical terminal using this configuration might require a land depth of 1,500 to 1,800 feet perpendicular to the wharf, and so might be most suitable for short, deep port properties.

FIG. 27 shows a container terminal layout with the ASC storage rows running parallel to the wharf. Again, "dry" and reefer ASC blocks alternate with one another in this example. The ASC/CAGV interchange zones are in strips stretching from waterside to landside, providing equal accessibility to landside RBC and waterside quay crane interchange zones. A typical terminal using this configuration might require a land depth of 800 to 1,200 feet, and so might be most suitable for long, narrow port properties.

This innovative system is much less sensitive to ASC orientation than existing systems, as the entire ASC complex resides entirely within the Robotic Operating Zone, and need not reflect the characteristics or requirements of the surrounding manned operations.

Figure 28:
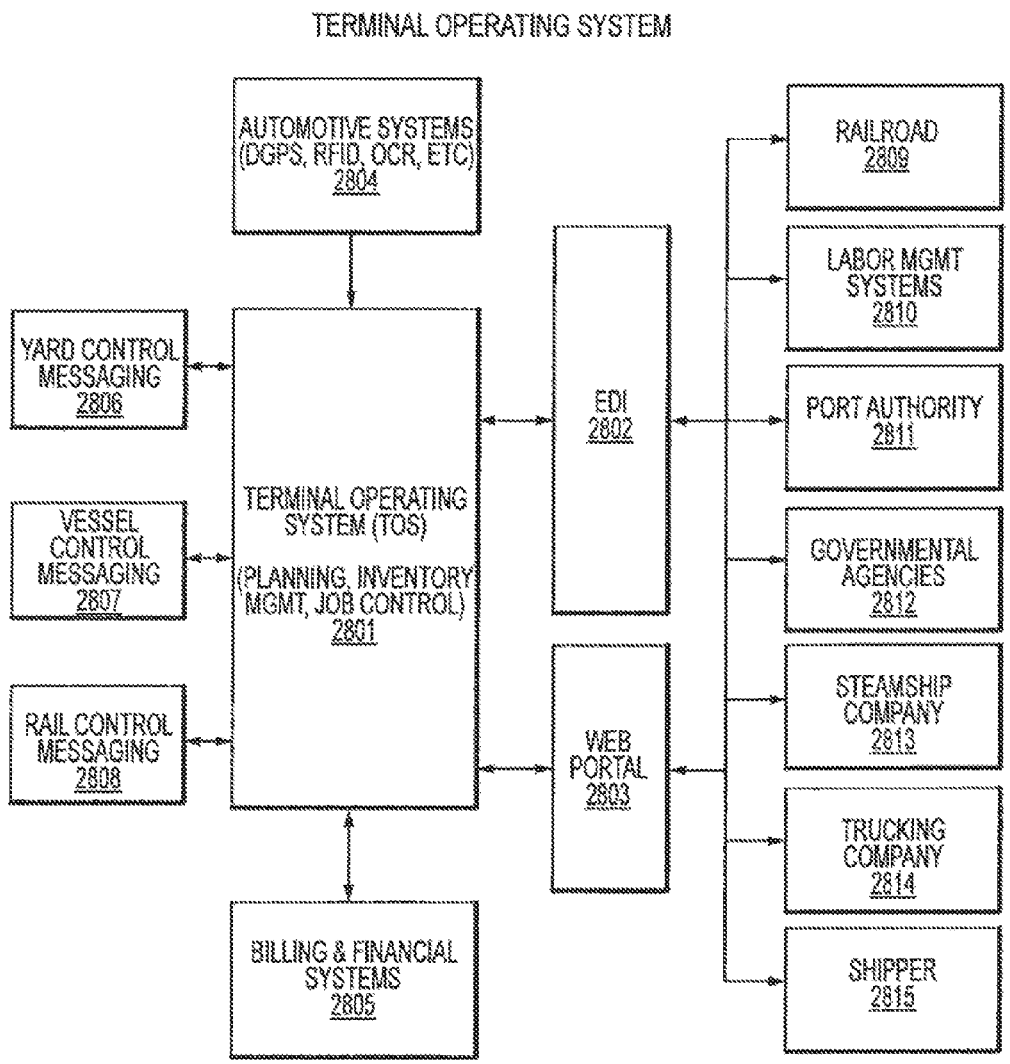
FIG. 28, Terminal Operating System, shows an exemplary general configuration of the major elements of a computer-based TOS.

FIG. 28 shows an exemplary configuration of the Terminal Operating System (TOS) that could be used to support system operations. The essential functions of the TOS 2801 are to allow operational planning and monitoring, inventory control, job control, and external commercial and regulatory communications and integration. Communication of container transaction data with external entities, including railroads 2809, labor management systems 2810, a port authority 2811, various governmental agencies 2812, and vessel operating companies 2813, can take place via an Electronic Data Interchange (EDI) 2802 that relies on industry-standard or customer specific message coding. Communication of commercial information with vessel operating companies 2813, trucking companies 2814, and freight shippers 2815 can take place via customer-specific web portals 2803. The TOS will typically interface directly with the terminal's automated instrumentation 2804, and with billing and financial systems 2805. The TOS fosters direction and monitoring of terminal operations through messaging modules focused on yard control 2806, vessel control 2807, and rail control 2808.

Figure 29:
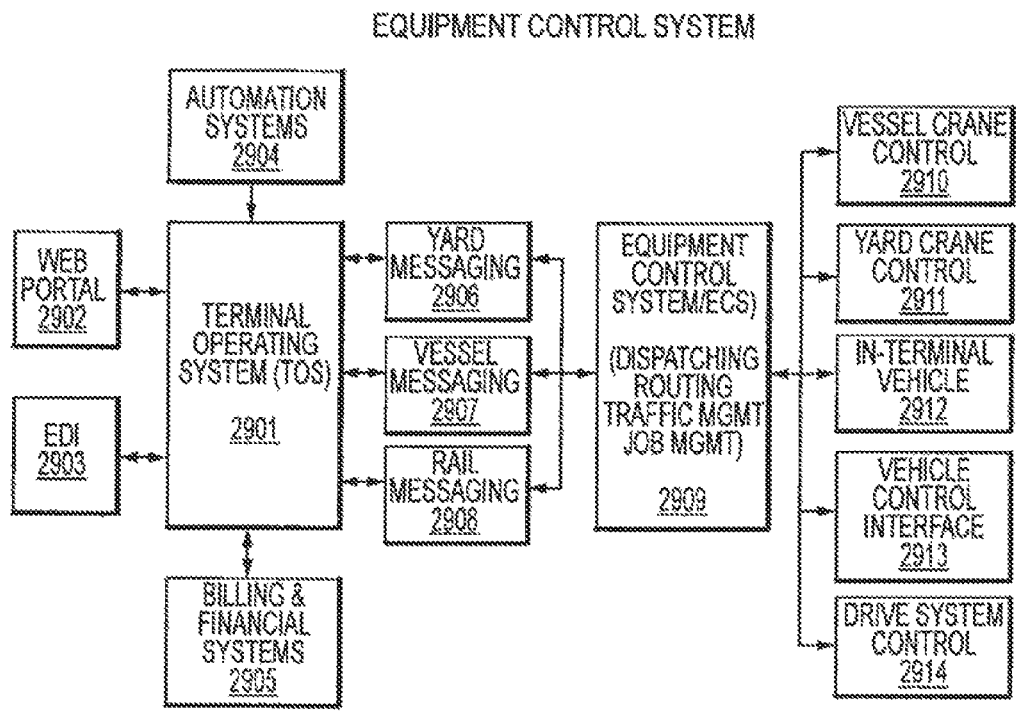
FIG. 29, Equipment Control System, shows an exemplary general configuration of the major elements of a computer-based ECS and its general relationship to the TOS.

FIG. 29 shows an exemplary configuration of an Equipment Control System (ECS) that could be used to monitor and control the operation of automated equipment. The essential functions of the ECS 2909 are to dispatch automated equipment to serve terminal jobs, route automated vehicles for optimum performance, monitor and manage the movement of automated equipment, and prioritize job execution to meet the demand set by the TOS. The ECS interfaces with the control messaging elements of the TOS 2906/2907/2908, receiving job orders generated by the TOS and reporting progress in fulfillment of those orders back to the TOS. The ECS interfaces with the control computers in vessel cranes 2910, automated yard cranes 2911, and automated guided vehicles 2912, exchanging movement instructions and status reports. The ECS can also interface with separate vehicle control 2913 that monitors and balances AGV traffic in the terminal. Depending on system architecture, the ECS can also interact directly with drive system controls 2914 on individual pieces of equipment.

With configuration shown in FIGS. 28 and 29, the TOS architecture is isolated from the demands of controlling and monitoring robotic operations and the ECS architecture is isolated from the demands of controlling and monitoring commercial and regulatory activities. This isolation of functionality improves the opportunity to optimize each element in a simpler environment, and allows automation to be applied across a range of terminals with different pre-existing TOSs.

Figure 30A:
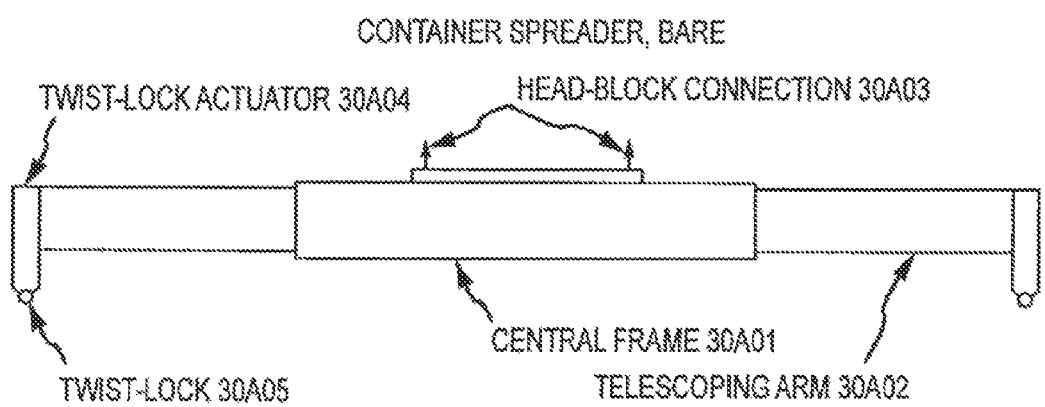
FIGS. 30A through 30C, Container Spreader, show an exemplary general configuration of a telescopic container spreader, such as those that would be used on ASCs, RBC, and quay cranes to pick up and set down shipping containers of various sizes and types.
Figure 30B:
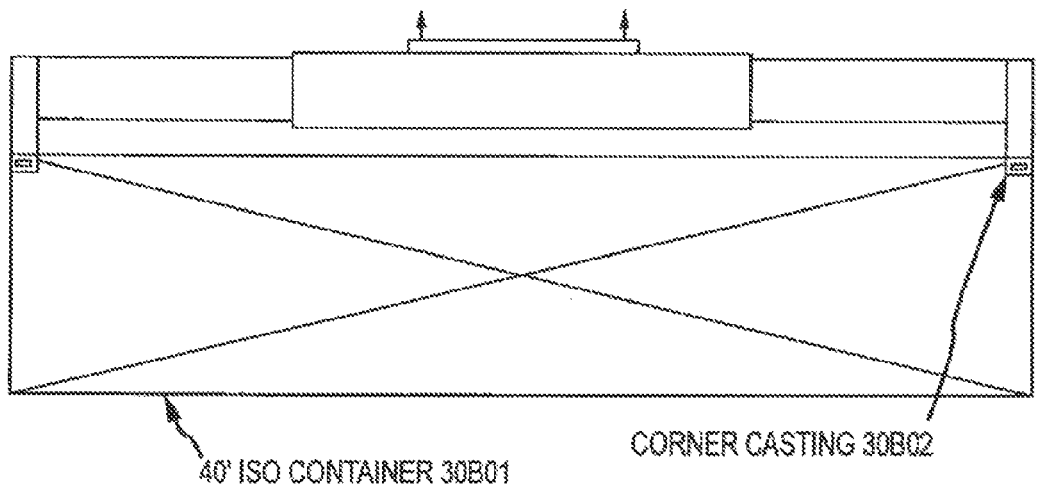
Figure 30C:
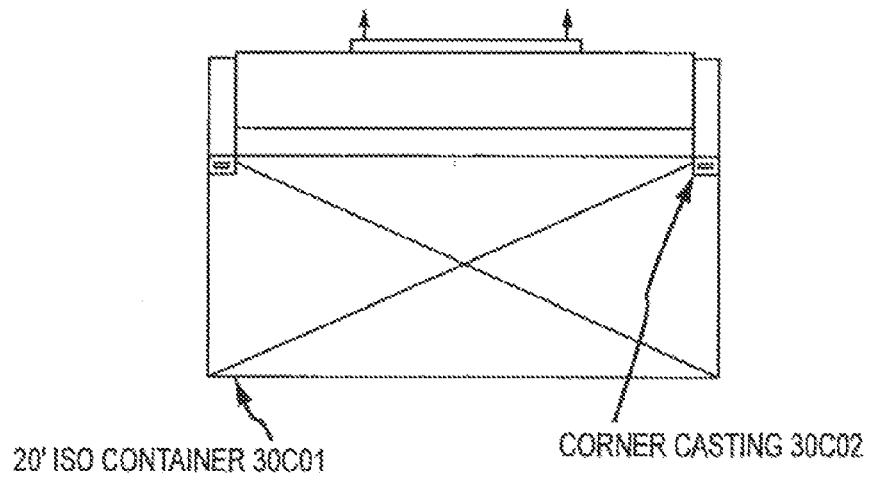

FIGS. 30A through 30C show the configuration of a typical telescopic container spreader, used by RBCs, ASCs, and quay cranes to pick and set containers. The central frame 30A01 of the spreader is attached, via a detachable head block connection 30A03, to the crane's head block assembly, which in turn holds the sheaves that carry the wire ropes attached to the crane's hoisting machinery. A set of four telescoping arms 30A02 slide through the central frame 30A01 and past one another, allowing the crane operator to change the length of the spreader to accommodate containers of different lengths. A twist-lock actuator 30A04 is attached to the end of each telescoping arm 30A02. At the operator's command, each twist-lock actuator rotates its twist-lock 30A05 through a right angle around a vertical axis. The twist-locks 30A05 are designed to fit into the oval holes in the corner castings 30B02/30C02 of ISO containers 30B01/30C01. In the "open" position, the twist-lock "blade" is parallel to the oval opening, and the twist-lock slides freely into or out of the corner casting, allowing the spreader to be mounted or dismounted at the top of the container. In the "closed" position, the twist-lock blade is perpendicular to the oval opening, and the twist-lock is captured within the corner casting, allowing the container to be picked up and moved. FIG. 30B shows the spreader expanded to accommodate a 40' ISO container 30B01. FIG. 30C shows the spreader compressed to accommodate 20' ISO container 30C01. A wide variety of manufacturers, including Bromma, R A M, and Stennis, build standardized container spreaders.

What is claimed is:

1. A port system for storing and transporting standardized containers in a port facility, comprising:
   at least one storage block for storing containers;
   two automated stacking cranes per storage block on common rails;
   a waterside crane for transferring containers into and out of a waterborne vessel;
   a landside crane for transferring containers onto and off of land transportation vehicles;
   a set of automated vehicles for transporting containers between the storage block and the waterside crane or landside crane, at least one of the automated vehicles comprising a work platform for containment and transport of workers and comprising a safety locator device defining a safety zone around the work platform;
   an equipment control system to control automated equipment, the control including preventing the automated equipment from entering the safety zone; and
   a terminal operating system to manage the port system;
   wherein the two automated stacking cranes are adapted to transfer containers between the storage block and the automated vehicles; and
   the landside and waterside cranes are adapted to transfer containers onto and off of the automated vehicles.

2. The system of claim 1, wherein the movement of the automated vehicles is controlled by the equipment control system.

3. The system of claim 2, wherein the automated vehicles use a common base adapted to receive any of a plurality of platforms including a container platform for holding a container, or a coning platform for placement and removal of container cones, or a reefer platform for access and maintenance of refrigerated containers, or a crane maintenance platform for maintenance of cranes.

4. The system of claim 3, wherein the automated stacking cranes are movable over the storage block on rails running substantially perpendicular to the waterside.

5. The system of claim 3, wherein the automated stacking cranes are movable over the storage block on rails running substantially parallel to the waterside.

6. The system of claim 3, wherein the storage block includes a first side accessible by the automated vehicles and a second side accessible by the automated vehicles, and wherein an automated stacking crane is positioned to load and unload containers to and from the automated vehicles.

7. The system of claim 6, wherein said first side and second side are opposite one another on the storage stack.

8. The system of claim 7, further comprising two substantially identical automated stacking cranes, wherein the first automated stacking crane serves the first side and the second automated stacking crane serves the second side.

9. The system of claim 8, wherein one of the automated stacking cranes is moveable over the storage block on rails running perpendicular to the waterside.

10. The system of claim 7, further comprising two nested automated stacking cranes of different size, whereby either automated stacking crane can serve either side.

11. The system of claim 1, wherein the work platform comprises a set of seats to receive and transport workers.

12. The system of claim 1, wherein the landside crane is a bridge crane having a first end that extends over a first area that receives said automated vehicles, and a second end that extends over a second area that receives land transportation, whereby the bridge crane can lift and move containers between the automated vehicles and the land transportation.

13. The system of claim 12, wherein said first end and second end are divided by a barrier to land transportation workers.

14. The system of claim 13, wherein said land transportation is a truck.

15. The system of claim 13, wherein said land transportation is a rail car.

16. A method for operating a port, comprising, in any order:
   establishing a storage block for storing standardized containers, said storage block including an automated stacking crane and at least two buffer areas;
   establishing a landside loading area with a landside crane;
   establishing a waterside loading area with a waterside crane;
   moving containers between landside transportation and automated vehicles using said landside crane;
   transporting containers between the landside crane and the storage block using said automated vehicles;
   transporting a work platform for containment and transport of workers using at least one of the automated vehicles, the work platform comprising a safety locator device;
   defining a safety zone around the work platform using the safety locator device;
   moving containers between the automated vehicles and the storage block using said automated stacking cranes;
   transporting containers between the storage block and the waterside crane using said automated vehicles;
   moving containers between the automated vehicles and waterborne vessels using said waterside crane; and
   controlling automated equipment, the controlling including preventing the automated equipment from entering the safety zone.

17. The method of claim 16, wherein the storage block includes two or more automated stacking cranes; and wherein the automated vehicles can be accessed by the automated stacking cranes at two or more locations.

18. The method of claim 17, wherein the automated stacking cranes are nested whereby either automated stacking crane can access either said location.

19. The method of claim 16, further comprising operating two substantially identical automated stacking cranes around a storage stack, wherein a first automated stacking crane serves a first side of the storage stack and a second automated stacking crane serves a second side of the storage stack.

* * * * *